US012756781B1

(12) United States Patent
Fucci et al.

(10) Patent No.: US 12,756,781 B1
(45) Date of Patent: Oct. 6, 2026

(54) ADAPTING AI VOICE INTERACTIONS BASED ON CALLER VOICE CHARACTERISTICS

(71) Applicant: RAPIDSOS, INC., New York, NY (US)

(72) Inventors: Conor Fucci, Brooklyn, NY (US); Piotr Stachowicz, Rzeszów (PL)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/635,616

(22) Filed: Mar. 31, 2026

(51) Int. Cl.
*H04M 3/51* (2006.01)
*H04M 3/523* (2006.01)
*H04M 3/56* (2006.01)

(52) U.S. Cl.
CPC ....... *H04M 3/5116* (2013.01); *H04M 3/5166* (2013.01); *H04M 3/5235* (2013.01);
(Continued)

(58) Field of Classification Search
CPC .. A61B 5/0004; A61B 5/318; A61N 1/37217; G05B 15/02; G06F 3/04845;
(Continued)

(56) References Cited

U.S. PATENT DOCUMENTS 5,479,482 A 12/1995 Grimes
7,349,706 B2 3/2008 Kim
(Continued)

FOREIGN PATENT DOCUMENTS

JP 2005135051 A 5/2005
KR 20090019606 A 2/2009
(Continued)

OTHER PUBLICATIONS

H. T. Otal, E. Stern and M. A. Canbaz, "LLM-Assisted Crisis Management: Building Advanced LLM Platforms for Effective Emergency Response and Public Collaboration," 2024 IEEE Conference on Artificial Intelligence (CAI), Singapore, Singapore, 2024 , pp. 851-859, doi: 10.1109/CAI59869.2024.00159. (Year: 2024).

(Continued)

*Primary Examiner* — Gerald Gauthier
(74) *Attorney, Agent, or Firm* — Michael Ross

(57) ABSTRACT

Methods, systems, and devices for adapting artificial intelligence voice interactions of a caller with an emergency communications center are described. In some implementations, a server may receive an incoming call to an emergency or non-emergency line of an emergency communications center and may initiate artificial intelligence voice agent interaction with the caller. The server may extract call metadata, including caller identification data and audio signals, to define a caller profile comprising parameters for voice characteristics and interaction pacing. Based on the caller profile, one or more artificial intelligence voice agents may generate audio output with tailored voice characteristics, interaction pacing, and conversational patterns. During the call, the artificial intelligence voice agents may evaluate interaction data to determine a disposition score, which may trigger either continued interaction by the artificial intelligence voice agents or escalation of the call to a human operator.

20 Claims, 16 Drawing Sheets

(52) U.S. Cl.
CPC ........ *H04M 3/563* (2013.01); *H04M 2201/39* (2013.01); *H04M 2201/40* (2013.01)

(58) Field of Classification Search
CPC ........... G06F 12/1408; G06F 16/24573; G06F 16/24578; G06F 16/248; G06F 40/35; G06N 5/02; G06N 20/00; G06Q 10/06395; G06Q 20/36; G06Q 30/016; G06Q 30/0633; G06V 40/20; G08B 27/001; G10L 13/00; G10L 25/84; G16H 80/00; H04B 1/3816; H04L 45/22; H04L 67/12; H04M 3/42161; H04M 3/42306; H04M 3/4936; H04M 3/5116; H04M 3/5166; H04M 3/5235; H04M 3/563; H04M 11/04; H04M 2201/29; H04M 2201/40; H04W 4/021; H04W 4/90; H04W 12/068; H04W 76/50
See application file for complete search history.

(56) References Cited

U.S. PATENT DOCUMENTS

| | | | | |
|---|---|---|---|---|
| 7,505,921 | B1 * | 3/2009 | Lukas | G06Q 30/0633 705/37 |
| 8,948,720 | B1 | 2/2015 | Chan | |
| 9,420,099 | B1 | 8/2016 | Krishnan | |
| 10,084,768 | B2 * | 9/2018 | Nix | H04B 1/3816 |
| 10,115,283 | B1 | 10/2018 | Sokolov | |
| 10,560,831 | B2 | 2/2020 | Winkler | |
| 10,607,141 | B2 * | 3/2020 | Jerram | G06N 5/02 |
| 10,645,216 | B1 * | 5/2020 | Hart | H04M 3/4936 |
| 10,701,542 | B2 | 6/2020 | Martin | |
| 10,728,732 | B2 | 7/2020 | Winkler | |
| 10,798,244 | B2 * | 10/2020 | Stepanian | G05B 15/02 |
| 10,805,786 | B2 | 10/2020 | Pellegrini | |
| 10,853,269 | B2 * | 12/2020 | Goss | G06F 12/1408 |
| 10,911,926 | B2 | 2/2021 | Pellegrini | |
| 11,197,145 | B2 | 12/2021 | Martin | |
| 11,201,966 | B1 * | 12/2021 | Restorff | G06F 40/35 |
| 11,218,584 | B2 | 1/2022 | Martin | |
| 11,310,647 | B2 | 4/2022 | Pellegrini | |
| 11,558,728 | B2 | 1/2023 | Pellegrini | |
| 11,633,112 | B2 * | 4/2023 | Stadler | A61B 5/0004 600/301 |
| 11,689,653 | B2 | 6/2023 | Martin | |
| 12,074,999 | B2 | 8/2024 | Martin | |
| 12,219,082 | B2 | 2/2025 | Martin | |
| 12,273,799 | B2 | 4/2025 | Martin | |
| 12,288,459 | B1 * | 4/2025 | Lewy | H04W 76/50 |
| 12,299,557 | B1 | 5/2025 | Ellis | |
| 12,301,756 | B1 * | 5/2025 | Olejar, Jr. | H04M 11/04 |
| 12,333,612 | B2 | 6/2025 | Thompson | |
| 12,452,369 | B1 * | 10/2025 | Olejar, Jr. | G06F 16/248 |
| 12,490,072 | B1 * | 12/2025 | Heneka | H04W 4/90 |
| 12,501,232 | B1 * | 12/2025 | Chang | H04W 4/021 |
| 12,627,759 | B1 * | 5/2026 | Vejmelka | H04M 3/5116 |
| 2006/0029188 | A1 | 2/2006 | Salafia | |
| 2006/0252998 | A1 | 11/2006 | Kimbrell | |
| 2009/0047924 | A1 | 2/2009 | Ray | |
| 2011/0119290 | A1 * | 5/2011 | Dhoble | G16H 80/00 707/769 |
| 2011/0249008 | A1 | 10/2011 | Keene | |
| 2011/0263219 | A1 | 10/2011 | Hasenfang | |
| 2012/0117082 | A1 * | 5/2012 | Koperda | G06F 16/24578 707/E17.084 |
| 2012/0218102 | A1 | 8/2012 | Bivens | |
| 2012/0256745 | A1 | 10/2012 | Piett | |
| 2013/0203376 | A1 | 8/2013 | Maier | |
| 2014/0155018 | A1 | 6/2014 | Fan | |
| 2014/0164505 | A1 | 6/2014 | Daly | |
| 2014/0359008 | A1 | 12/2014 | Finney | |
| 2015/0103995 | A1 | 4/2015 | Mccormack | |
| 2016/0127808 | A1 * | 5/2016 | Wong | G06F 16/24573 379/112.04 |
| 2017/0180567 | A1 * | 6/2017 | Sharma | H04L 45/22 |
| 2017/0310827 | A1 | 10/2017 | Mehta | |
| 2017/0331954 | A1 | 11/2017 | Kotnis | |
| 2018/0352084 | A1 | 12/2018 | Czachor, Jr. | |
| 2019/0156838 | A1 | 5/2019 | Kannan | |
| 2019/0312979 | A1 * | 10/2019 | Sharma | G06F 16/24573 |
| 2019/0380020 | A1 | 12/2019 | Pellegrini | |
| 2020/0007684 | A1 * | 1/2020 | Chang | G06Q 30/016 |
| 2020/0100084 | A1 | 3/2020 | Martin | |
| 2020/0174803 | A1 | 6/2020 | Kautzleben | |
| 2020/0274962 | A1 | 8/2020 | Martin | |
| 2020/0314245 | A1 * | 10/2020 | Chavez | H04M 3/5235 |
| 2020/0314623 | A1 | 10/2020 | Pellegrini | |
| 2020/0334470 | A1 | 10/2020 | Abeykoon et al. | |
| 2020/0364723 | A1 | 11/2020 | Gitlevich | |
| 2021/0006960 | A1 | 1/2021 | Martin | |
| 2021/0012894 | A1 | 1/2021 | Zelocchi | |
| 2021/0037368 | A1 | 2/2021 | Pellegrini | |
| 2021/0043099 | A1 | 2/2021 | Du | |
| 2021/0120394 | A1 | 4/2021 | Martin | |
| 2021/0125494 | A1 | 4/2021 | Cho | |
| 2021/0136202 | A1 * | 5/2021 | Paiva | H04M 3/42161 |
| 2021/0266722 | A1 | 8/2021 | Pellegrini | |
| 2021/0352460 | A1 * | 11/2021 | Rohde | H04M 3/5116 |
| 2021/0352478 | A1 * | 11/2021 | Hauser | H04W 12/068 |
| 2022/0014895 | A1 | 1/2022 | Horelik | |
| 2022/0201458 | A1 | 6/2022 | Pellegrini | |
| 2022/0210272 | A1 | 6/2022 | Horelik | |
| 2022/0261260 | A1 | 8/2022 | Momchilov | |
| 2022/0353663 | A1 | 11/2022 | Mehta | |
| 2022/0360663 | A1 * | 11/2022 | Kempson | H04M 3/42306 |
| 2022/0383998 | A1 | 12/2022 | Cossler | |
| 2023/0014517 | A1 | 1/2023 | Martin | |
| 2023/0032167 | A1 * | 2/2023 | Yannam | G06N 20/00 |
| 2023/0044156 | A1 | 2/2023 | Mehta | |
| 2023/0048015 | A1 | 2/2023 | Pellegrini | |
| 2023/0114663 | A1 | 4/2023 | Pellegrini | |
| 2023/0271019 | A1 * | 8/2023 | DeBates | A61N 1/37217 607/60 |
| 2023/0319180 | A1 | 10/2023 | Mario | |
| 2023/0343460 | A1 | 10/2023 | Gnanasambandam | |
| 2023/0370540 | A1 | 11/2023 | Martin | |
| 2024/0022663 | A1 | 1/2024 | Kolaxis | |
| 2024/0049352 | A1 | 2/2024 | Kelly | |
| 2024/0098473 | A1 | 3/2024 | Ingram | |
| 2024/0211827 | A1 | 6/2024 | Stoops | |
| 2024/0304315 | A1 | 9/2024 | Bhansali | |
| 2024/0350813 | A1 * | 10/2024 | DeBates | G06F 3/04845 |
| 2024/0403563 | A1 | 12/2024 | Bex, IV | |
| 2024/0406309 | A1 | 12/2024 | Misiorny | |
| 2024/0419976 | A1 | 12/2024 | Gross | |
| 2024/0420129 | A1 | 12/2024 | Ramde | |
| 2025/0030803 | A1 | 1/2025 | Liss | |
| 2025/0047788 | A1 | 2/2025 | Blustein | |
| 2025/0104709 | A1 | 3/2025 | Harvey | |
| 2025/0118200 | A1 | 4/2025 | Jennifer | |
| 2025/0131841 | A1 * | 4/2025 | Pineda | G10L 13/00 |
| 2025/0193309 | A1 * | 6/2025 | Gleicher | G08B 27/001 |
| 2025/0209557 | A1 | 6/2025 | Addy | |
| 2025/0211681 | A1 | 6/2025 | Bondareva | |
| 2025/0266043 | A1 * | 8/2025 | Maizels | G10L 25/84 |
| 2025/0279100 | A1 * | 9/2025 | Maizels | G06V 40/20 |
| 2025/0286953 | A1 | 9/2025 | Alexander | |
| 2025/0358366 | A1 | 11/2025 | Olejar | |
| 2026/0006132 | A1 * | 1/2026 | Katt | H04M 11/04 |
| 2026/0060589 | A1 * | 3/2026 | Odeh | A61B 5/318 |
| 2026/0105438 | A1 * | 4/2026 | Cella | G06Q 20/36 |
| 2026/0120038 | A1 * | 4/2026 | MacDonald | G06Q 10/06395 |
| 2026/0143326 | A1 * | 5/2026 | Leetun | H04L 67/12 |

FOREIGN PATENT DOCUMENTS

| | | | |
|---|---|---|---|
| WO | 0165763 | A2 | 9/2001 |
| WO | 2013099488 | A1 | 7/2013 |

(56) References Cited

FOREIGN PATENT DOCUMENTS

| | | | |
|---|---|---|---|
| WO | 2014025563 | A1 | 2/2014 |
| WO | 2014176646 | A1 | 11/2014 |

OTHER PUBLICATIONS

LangChain. Q&A with RAG. Available at https://python.langchain.com/docs/tutorials/rag/. (29 pgs.)(Accessed Jun. q2024).

Microsoft Learn. Vectors in Azure AI Search. Available at https://learn.microsoft. com/en-us/azure/search/vector¬ search-overview. (8 pgs.) (Accessed Jun. 2024).

Microsoft Learn. What is Azure AI Document Intelligence. Available at https://learn.microsoft.com/en-us/azure/ai-services/document-intelligence/overview?view=doc-intel-4.0.0. (22 pgs.) (Accessed Jun. 2024).

National Emergency Number Association (NENA). The NENA Enhanced PSAP Registry and Census (EPRC) 2.0. at https://eprc-nena.hub.arcgis.com/pages/nena-eprc. (4 pgs.) (Accessed Jun. 2024).

* cited by examiner

ADAPTING AI VOICE INTERACTIONS BASED ON CALLER VOICE CHARACTERISTICS

FIELD OF TECHNOLOGY

The present disclosure relates generally to emergency response systems, and more specifically to adapting AI voice interactions based on caller voice characteristics.

BACKGROUND

Emergency Communications Centers (ECCs) are increasingly overwhelmed by a surge in call volumes that often exceeds the operational capacity of human personnel. This persistent imbalance, coupled with widespread staffing shortages, leaves call-takers stretched thin and vulnerable to professional burnout and cognitive fatigue. Such high-density environments create critical bottlenecks where human operators cannot keep pace with incoming traffic, leading to increased wait times and diminished response efficiency.

SUMMARY

The described techniques relate to improved methods, systems, devices, and apparatuses that support techniques for adapting AI voice interactions based on caller demographics and context. Some implementations may provide an audience-adaptive artificial intelligence (AI) voice agent system designed to dynamically tailor its communication style to the demographic characteristics and interaction context of each caller. The system may comprise four primary components: an audience profile module, an adaptive voice engine, a conversation flow controller, and a triage decision engine. The audience profile module may identify caller demographics through pre-registered profiles, real-time voice analysis, or contextual signals, generating a structured demographic profile object. The adaptive voice engine may utilize this profile to adjust voice characteristics, including pitch, speech rate, intonation, and vocabulary complexity, ensuring that the synthesized voice output aligns with the caller's communication needs. The conversation flow controller may modify interaction pacing, patience thresholds, and menu structures to further enhance accessibility and usability for specific demographics. The triage decision engine may continuously evaluate the interaction, monitoring for difficulty signals and determining whether the call may be resolved by the AI agent or may require escalation to a human operator.

By integrating these components, the system may enable real-time adaptation of voice and conversational parameters, providing a tailored and effective communication experience for diverse user groups. For example, elderly callers may benefit from slower speech, warmer tones, and simplified prompts, while the system may dynamically adjust to signs of difficulty, such as extended silences or repeated clarification requests. Some implementations of the system may reduce reliance on human operators, improve user satisfaction, and enhance safety outcomes by reducing (e.g., minimizing) miscommunication during critical interactions. This audience-adaptive approach may represent a significant advancement over existing AI voice systems, addressing the unmet needs of vulnerable populations and offering a scalable, cost-effective solution for industries such as healthcare, customer service, and emergency response.

A method for adapting AI voice interactions of a caller with an ECC is described. The method may include receiving, by a server, an incoming call to an emergency line or a non-emergency line of an ECC. The method may include initiating AI voice agent interaction with a caller during the incoming call using one or more AI voice agents. The method may include extracting, from the incoming call with the one or more AI voice agents, call metadata including caller identification data and audio signals. The method may include defining, by the server, a caller profile of the caller based on the caller identification data and the audio signals, the caller profile including parameters for voice characteristics and interaction pacing. The method may include generating, by the one or more AI voice agents, audio output with tailored voice characteristics, interaction pacing, and conversational patterns based on the caller profile. The method may include evaluating, by the one or more AI voice agents, interaction data during the call to determine a disposition score, the disposition score triggering either continued interaction by the one or more AI voice agents or escalation of the incoming call to a human operator.

A system configured for adapting AI voice interactions of a caller with an ECC is described. The system may include a processor and memory coupled with the processor. The system may include instructions stored in the memory and executable by the processor to cause the system to receive an incoming call to an emergency line or a non-emergency line of an ECC. The system may initiate AI voice agent interaction with a caller during the incoming call using one or more AI voice agents. The system may extract, from the incoming call with the one or more AI voice agents, call metadata including caller identification data and audio signals. The system may define a caller profile of the caller based on the caller identification data and the audio signals, the caller profile including parameters for voice characteristics and interaction pacing. The system may generate audio output with tailored voice characteristics, interaction pacing, and conversational patterns based on the caller profile. The system may evaluate interaction data during the call to determine a disposition score, the disposition score triggering either continued interaction by the one or more AI voice agents or escalation of the incoming call to a human operator.

Another system for adapting AI voice interactions of a caller with an ECC is described. The system may include means for receiving, by a server, an incoming call to an emergency line or a non-emergency line of an ECC. The system may include means for initiating AI voice agent interaction with a caller during the incoming call using one or more AI voice agents. The system may include means for extracting, from the incoming call with the one or more AI voice agents, call metadata including caller identification data and audio signals. The system may include means for defining, by the server, a caller profile of the caller based on the caller identification data and the audio signals, the caller profile including parameters for voice characteristics and interaction pacing. The system may include means for generating, by the one or more AI voice agents, audio output with tailored voice characteristics, interaction pacing, and conversational patterns based on the caller profile. The system may include means for evaluating, by the one or more AI voice agents, interaction data during the call to determine a disposition score, the disposition score triggering either continued interaction by the one or more AI voice agents or escalation of the incoming call to a human operator.

A non-transitory computer-readable medium storing code for adapting AI voice interactions of a caller with an ECC is described. The code may include instructions executable by a processor to receive an incoming call to an emergency line or a non-emergency line of an ECC. The code may include instructions executable by a processor to initiate AI voice agent interaction with a caller during the incoming call using one or more AI voice agents. The code may include instructions executable by a processor to extract, from the incoming call with the one or more AI voice agents, call metadata including caller identification data and audio signals. The code may include instructions executable by a processor to define a caller profile of the caller based on the caller identification data and the audio signals, the caller profile including parameters for voice characteristics and interaction pacing. The code may include instructions executable by a processor to generate audio output with tailored voice characteristics, interaction pacing, and conversational patterns based on the caller profile. The code may include instructions executable by a processor to evaluate interaction data during the call to determine a disposition score, the disposition score triggering either continued interaction by the one or more AI voice agents or escalation of the incoming call to a human operator.

Some examples of the method, systems, and non-transitory computer-readable medium described herein may further include operations, features, means, or instructions for analyzing the audio signals to extract acoustic features including fundamental frequency, speech rate, pause duration, and tremor characteristics, and classifying the caller into a demographic category based on a probabilistic model trained on these features. Tremor characteristics may include involuntary oscillations in vocal fold vibration that manifest as periodic variations in pitch and amplitude at regular intervals within the caller's speech signal. Measurable tremor parameters may include tremor frequency (e.g., typically in the range of 4-8 Hz for age-related vocal tremor), tremor amplitude, tremor regularity, and related jitter and shimmer metrics that quantify cycle-to-cycle variations in fundamental frequency and waveform amplitude, respectively. The detected tremor characteristics may be indicative of caller attributes such as age-related vocal tremor in elderly callers, elevated emotional distress, or neurological conditions that affect vocal motor control. In response to detecting tremor characteristics that exceed a confidence threshold, the system may inform voice adaptation parameters by selecting warmer tones, reducing speech rate, increasing patience thresholds for caller response times, and simplifying conversational prompts to accommodate the inferred needs of the caller.

Some examples of the method, systems, and non-transitory computer-readable medium described herein may further include operations, features, means, or instructions for retrieving a stored demographic profile associated with the caller identification data from a database and merging the retrieved demographic profile with the caller profile to refine the parameters for voice characteristics and interaction pacing.

Some examples of the method, systems, and non-transitory computer-readable medium described herein may further include operations, features, means, or instructions for comparing acoustic features extracted from the current call, including fundamental frequency, speech rate, pause duration, tremor characteristics, jitter, and shimmer, with historical acoustic feature data from one or more previous calls by the same caller stored in a database to establish a caller-specific acoustic baseline. A statistically significant deviation or degradation between the historical baseline acoustic features and the current acoustic features may indicate that a negative health event, cognitive decline, or other adverse condition is affecting the caller. Such deviations may include, for example, a measurable increase in tremor amplitude or frequency relative to the caller's established baseline, a notable reduction in speech rate beyond the caller's historical norm, an increase in jitter or shimmer values exceeding a predefined variance threshold, or an increase in pause duration or pause frequency compared to prior interactions. In response to detecting one or more such deviations, the system may adjust the disposition score to favor earlier escalation to a human operator, flag the interaction for caregiver or administrator follow-up, transmit an alert to a designated emergency contact or caregiver, and/or adapt conversational parameters to accommodate the inferred change in the caller's condition, such as by further reducing speech rate, simplifying vocabulary, and increasing patience thresholds. This comparison of historical and current acoustic features may enable early detection of progressive conditions, such as advancing neurological disorders, as well as acute changes in caller health status that may not be apparent from a single interaction analyzed in isolation.

Some examples of the method, systems, and non-transitory computer-readable medium described herein may further include operations, features, means, or instructions for dynamically adjusting the tailored voice characteristics, interaction pacing, and conversational patterns during the call in response to detecting difficulty signals including repeated clarification requests, extended silences, or low-confidence speech recognition outputs.

Some examples of the method, systems, and non-transitory computer-readable medium described herein may further include operations, features, means, or instructions for determining the disposition score by evaluating interaction data including transcribed caller speech for emergency keywords, acoustic distress signals, and metadata related to caller behavior during the interaction.

Some examples of the method, systems, and non-transitory computer-readable medium described herein may further include operations, features, means, or instructions for escalating the incoming call to a human operator by creating a conference bridge that connects the caller, the one or more AI voice agents, and the human operator, while transferring contextual data including the caller profile and interaction summary.

In some examples of the method, systems, and non-transitory computer-readable medium described herein, the caller profile may include parameters for conversational patterns that are adjusted to include extended pauses and simplified vocabulary in response to detecting speech patterns indicative of cognitive impairment. Speech patterns indicative of cognitive impairment may include word-finding difficulties or hesitations (e.g., anomia), reduced syntactic complexity or shorter sentence structures, repetitive phrasing or circular speech patterns, slower speech rate with irregular pauses, reduced vocabulary diversity, difficulty following multi-step instructions or questions, and tangential or off-topic responses. The system may detect these patterns using natural language processing to assess semantic coherence and vocabulary diversity of transcribed caller speech, speech rate analysis to identify irregular pause distributions and reduced words-per-minute output, and semantic coherence scoring to determine whether caller responses are relevant to the prompts provided by the AI voice agent. In response to detecting one or more of these patterns, the system may adapt conversational parameters by reducing the number of options presented per prompt, breaking multi-step questions into sequential single-step queries, increasing pause duration between prompts, repeating and confirming critical information more frequently, and simplifying vocabulary and sentence structures in the AI voice agent output.

In some examples of the method, systems, and non-transitory computer-readable medium described herein, the caller profile may be refined by incorporating contextual signals from the originating device, including device type and associated user characteristics, to enhance demographic classification accuracy.

In some examples of the method, systems, and non-transitory computer-readable medium described herein, the tailored voice characteristics may include adjustments to prosodic contours and pitch variance to align with generational communication norms identified in the caller profile.

In some examples of the method, systems, and non-transitory computer-readable medium described herein, the interaction pacing may be dynamically modified during the call in response to detecting acoustic markers of emotional distress, including elevated pitch variance and irregular speech rhythm.

In some examples of the method, systems, and non-transitory computer-readable medium described herein, the conversational patterns may include increased confirmation loops and repetition of critical information in response to detecting low-confidence outputs from automatic speech recognition. A confirmation loop may comprise the AI voice agent repeating back information provided by the caller and requesting explicit verification before proceeding, such as stating "You said your address is 123 Main Street—is that correct?" or "I heard that you are experiencing chest pain-please say yes if that is correct." The frequency of confirmation loops may be dynamically increased when the automatic speech recognition engine reports confidence scores below a predefined threshold (e.g., below 0.7) for caller utterances, thereby reducing the risk of acting on misrecognized speech in safety-critical contexts.

In some examples of the method, systems, and non-transitory computer-readable medium described herein, the disposition score may be further determined by analyzing metadata related to caller silence events and interaction duration to assess the likelihood of unresolved caller needs. A caller silence event may be defined as a period of caller inactivity exceeding a predefined duration threshold (e.g., 3 seconds or longer) following an AI voice agent prompt that expects a response, as distinguished from normal conversational pauses (e.g., less than 1.5 seconds) that occur naturally during speech production. The system may track the frequency, duration, and timing of caller silence events throughout the interaction, and an elevated count of silence events or progressively lengthening silence durations may indicate caller confusion, difficulty understanding prompts, or potential distress, thereby contributing to an increased disposition score.

DETAILED DESCRIPTION

Figure 1:
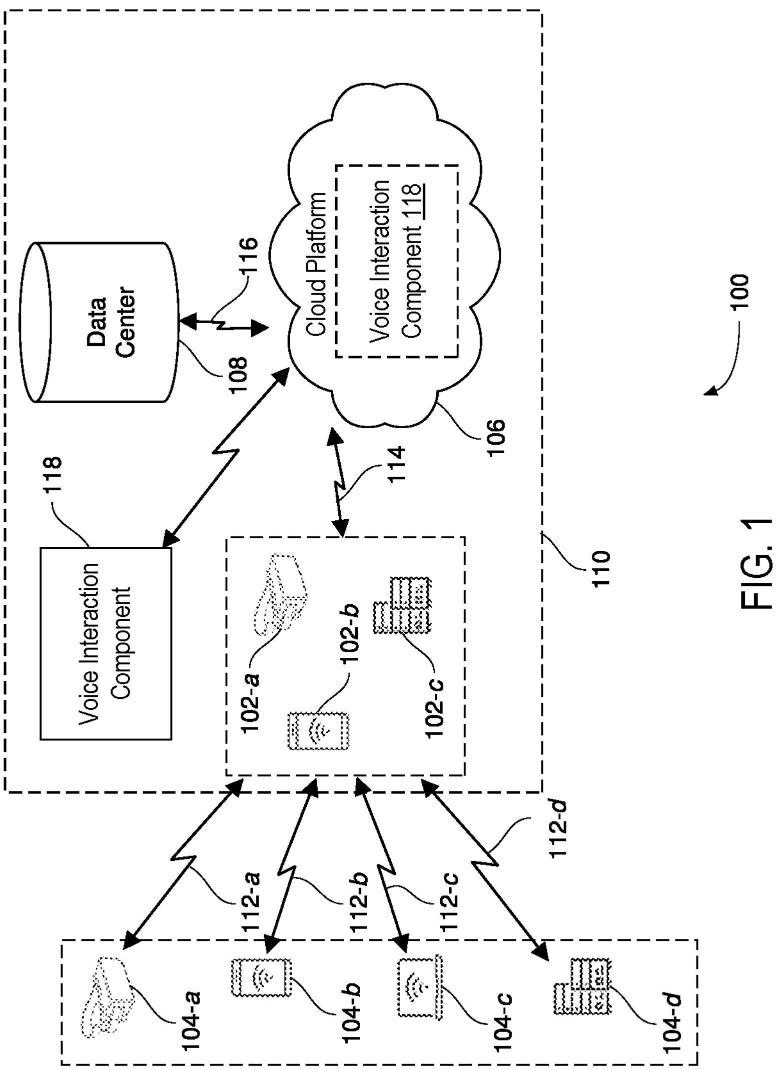
FIG. 1 illustrates an example of a system for data processing that supports adapting AI voice interactions based on caller demographics and context in accordance with aspects of the present disclosure.

Methods, systems, devices, and apparatuses that support techniques for adapting AI voice interactions based on caller demographics and context are disclosed. In some examples, existing artificial intelligence (AI) voice agent systems may be inadequate for addressing the communication needs of diverse demographic groups, particularly vulnerable populations such as elderly individuals. These systems may rely on static communication parameters that fail to account for age-related hearing impairments, slower cognitive processing speeds, or generational conversational norms. As a result, elderly users may often experience frustration, miscommunication, and abandonment of AI interactions, leading to increased reliance on costly human operators. In industries such as medical alert monitoring, where elderly users may represent a significant portion of the customer base, this limitation may create inefficiencies, higher operational costs, and potential safety risks during critical interactions. Current solutions, including pre-recorded voice profiles and basic volume adjustments, may not provide the dynamic, real-time adaptability required to address these challenges. Furthermore, existing call center triage systems may lack the ability to modify interaction styles based on caller demographics, further exacerbating the problem. The absence of a comprehensive, audience-adaptive AI voice agent system may leave a significant gap in the market for solutions that can improve accessibility, reduce costs, and enhance user satisfaction.

In some implementations, a system may dynamically adapt its interaction strategies with callers based on their voice characteristics and/or the context of the interaction. Voice characteristics may include acoustic features extracted from the caller's audio, such as fundamental frequency, speech rate, pause duration, tremor, pitch variance, and formant frequencies, and these voice characteristics may be analyzed to infer demographic characteristics of the caller, such as age group, gender, dialect, or cognitive state. This system may consist of several interconnected components that collaboratively modify voice characteristics, conversational patterns, and decision-making processes during a call. Key components may include an audience profile module, an adaptive voice engine, a conversation flow controller, and a triage decision engine, all of which may communicate through an internal communication layer to enable real-time updates during active calls. The audience profile module may identify demographic characteristics using methods such as querying databases for pre-registered profiles or analyzing voice features like pitch, speaking speed, and pauses to classify callers into categories such as elderly, pediatric, or general adult. Contextual signals, such as the type of device initiating the call, may further inform demographic classification, and if confidence in the classification is low, the system may default to broadly accessible configurations or prompt the caller for preferences. The structured demographic profile generated by this module may guide other components in tailoring the interaction to the caller's needs.

In some implementations, the adaptive voice engine may generate voice output customized to the demographic profile identified by the audience profile module. This engine may adjust pitch, speaking speed, pause duration, and intonation patterns to align with the caller's characteristics and preferences. For instance, pitch may be lowered to a warmer tone for elderly callers, while speaking speed may be reduced for individuals who may process information more slowly. The timing of pauses may be modified to allow additional processing time, and intonation patterns may be adjusted to reflect generational speech norms. The engine may select a voice model from a library of pre-configured options that best matches the caller's demographic profile, applying these configurations to a voice synthesis system that may use neural text-to-speech technology or pre-recorded audio segments. Dynamic updates to voice parameters may occur during the call based on feedback from other system components, ensuring the interaction remains responsive to the caller's needs.

In some implementations, a conversation flow controller may manage the structure and pacing of interactions between the system and the caller. This controller may adjust response wait times, allowing longer pauses for callers who may need additional time to reply. It may also modify the timing of system responses to avoid interrupting callers who speak slowly or pause frequently. Critical information may be repeated and confirmed more frequently for specific demographic groups, while outgoing prompts may be simplified if they exceed a readability threshold. Sentence length may be limited to reduce cognitive load, and decision trees may be streamlined to present fewer options for easier navigation. Additionally, the controller may include a mode for extended conversations, catering to callers who may seek social interaction rather than transactional assistance. When speech patterns or interaction signals indicative of cognitive impairment are detected, the conversation flow controller may further adapt by limiting questions to single-topic prompts rather than compound or multi-part questions, thereby reducing the cognitive demand on the caller. The controller may provide verbal anchoring or context reminders during longer interactions (e.g., restating the purpose of the call or summarizing previously collected information) to help the caller maintain orientation within the conversation. The controller may transition from open-ended questions to closed-ended questions (e.g., yes/no or binary-choice prompts) when signs of confusion are detected, and may repeat the caller's statements back to confirm understanding before proceeding to subsequent prompts. The controller may further avoid abstract concepts, figurative language, or idiomatic expressions that may cause confusion, instead using concrete and literal phrasing in all AI voice agent outputs. The conversation flow controller may monitor for signs of caller confusion, such as long pauses exceeding a predefined duration, off-topic or tangential responses, or repeated requests for clarification, and may use these signals to trigger incremental adjustments to the conversational flow in real time. These adjustments may ensure that the interaction remains accessible and engaging for a diverse range of callers.

In some implementations, a triage decision engine may evaluate interactions in real time to determine whether the system may resolve the call or if escalation to a human operator may be necessary. This engine may analyze multiple input streams, including the caller's speech, acoustic signals, and metadata about the interaction, to detect emergency-related keywords, signs of emotional distress, or repeated difficulties. These inputs may be combined into a score that determines the next steps, such as escalating the call to a human operator via transfer or conference bridge if the score exceeds a certain threshold. For non-emergency situations, the system may classify the call into a specific category and continue handling it accordingly. Persistent difficulties detected during the interaction may also contribute to the triage decision engine's evaluation, ensuring that escalation decisions are informed by real-time feedback.

In some implementations, a real-time feedback loop may monitor interactions and adjust the system's behavior in response to detected difficulties. Signals such as repeated requests for clarification, extended silences, low-confidence speech recognition results, or signs of emotional distress may trigger incremental adjustments to parameters like speaking speed, pause duration, or vocabulary complexity. These adjustments may be applied gradually to avoid confusing the caller, ensuring that the system remains adaptive without overwhelming the user. Persistent difficulties may further inform the triage decision engine's assessment of whether escalation may be necessary, creating a seamless integration between real-time monitoring and decision-making processes.

In some implementations, the system may integrate with telephony systems to handle both incoming and outgoing calls. For incoming calls, telephony protocols may be used to extract information such as the caller's phone number, which may assist in demographic identification. For outgoing calls, the system may initiate interactions based on external triggers, such as device activations. The system may also support adding a human operator to an ongoing call or transferring the call to a queue, with relevant context provided to the receiving operator. Compatibility with various telephony technologies, including dual-tone multi-frequency signaling and browser-based communication, may ensure the system's versatility across different platforms and use cases.

In some implementations, a database may store caller profiles containing demographic classifications, communication preferences, known conditions, and historical interaction data. These profiles may be updated after each interaction to reflect new information, such as adjustments made during the call. Authorized caregivers or administrators may configure or override settings for specific profiles through a portal or application programming interface, with all changes logged for auditing purposes. This database may serve as a central repository for maintaining and refining caller information, ensuring that future interactions are informed by past experiences and tailored to individual needs.

In some implementations, measures may be implemented to protect the privacy and security of caller data. Audio streams and transcriptions may be encrypted during transmission, while stored data may be secured using advanced encryption methods. Access to data may be restricted based on user roles, and all data operations may be logged for accountability. The system may track and manage caller consent for data collection and processing, ensuring compliance with regulations. Configurable retention periods may allow administrators to manage data storage policies, and the system may avoid storing certain types of data if prohibited by applicable laws.

In some implementations, the system may track performance metrics to evaluate its effectiveness in handling interactions. Metrics may include the percentage of calls resolved without human intervention, the average time taken to handle calls, and the frequency of difficulty signals. The system may calculate the cost of handling calls based on factors such as computing resources and human labor, displaying these metrics in a dashboard for monitoring purposes. Alerts may be triggered if certain thresholds are exceeded, enabling administrators to address issues proactively and optimize system performance over time.

Aspects of the subject matter described in this disclosure can be implemented to realize one or more of the following potential advantages. The described techniques may be implemented to support improved accessibility for diverse user groups by dynamically tailoring interactions to align with individual communication needs. The system may enhance operational efficiency by reducing the reliance on human operators for non-critical interactions, thereby optimizing resource allocation. It may improve user satisfaction by fostering interactions that feel personalized and empathetic, which may be particularly beneficial for vulnerable populations. The described features may enable scalable deployment across various industries, including healthcare, customer service, and emergency response, by leveraging modular components that can adapt to different use cases. The system may also facilitate data-driven decision-making by generating structured interaction data that can inform service improvements and strategic planning.

The disclosed systems and methods transform the technological area of emergency response management by providing a technical solution to the inherent limitations of static automated systems in high-stress environments. Conventional AI voice agents utilize rigid communication parameters and linear interaction flows that are problematic for the demographically diverse and high-stakes nature of Emergency Communications Centers (ECCs). Such legacy systems fail to account for communication barriers-such as age-related hearing impairments, cognitive processing delays, or emotional distress-resulting in high call-abandonment rates and unnecessary escalations that further strain overwhelmed human personnel. The disclosed audience-adaptive system provides a specific technological improvement by implementing a real-time feedback loop that extracts and analyzes nuanced acoustic features (e.g., fundamental frequency, speech rate, and tremor characteristics) to dynamically reconfigure the voice synthesis pipeline and conversation flow. For example, the disclosed system may advantageously lead to higher automated-triage accuracy (through the generation of a data-driven disposition score), improved information elicitation from vulnerable populations (via tailored prosodic contours and interaction pacing), and reduced professional burnout for human call-takers (by automating complex interactions and transferring structured contextual metadata during escalation). By integrating real-time voice characteristic analysis with a dynamic triage decision engine, the system achieves a practical application that enhances the reliability and efficiency of emergency telecommunications infrastructure. Various embodiments of the disclosure are described hereafter and represented in FIGS. 1-15.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to adapting AI voice interactions based on caller demographics and context.

FIG. 1 illustrates an example of a system 100 that supports adapting AI voice interactions based on caller demographics and context in accordance with various aspects of the present disclosure. The system 100 includes cloud clients 102, user devices 104, a cloud platform 106, and a data center 108. Cloud platform 106 may be an example of a public or private cloud network. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a wearable device (e.g., cloud client 102-*a*), a smartphone (e.g., cloud client 102-*b*), or a server (e.g., cloud client 102-*c*). In other examples, a cloud client 102 may be a desktop or laptop computer, a tablet, a sensor, or another computing device or system capable of generating, analyzing, transmitting, or receiving communications. In some examples, a cloud client 102 may be part of a business, an enterprise, a non-profit, a startup, or any other organization type.

A cloud client 102 may facilitate communication between the data center 108 and one or multiple user devices 104 to implement an online environment. The network connection 112 may include communications, opportunities, purchases, sales, or any other interaction between a cloud client 102 and a user device 104. The network connection 112 may include a wired connection, a wireless connection, or both. A cloud client 102 may access cloud platform 106 to store, manage, and process the data communicated via one or more network connections 112. In some cases, the cloud client 102 may have an associated security or permission level. A cloud client 102 may have access to certain applications, data, and database information within cloud platform 106 based on the associated security or permission level, and may not have access to others.

The user device 104 may include an AI voice interaction component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-*a*, 112-*b*, 112-*c*, and 112-*d*) via a computer network. In an example, the user device 104 may be computing device such as a wearable device 104-*a*, a smartphone 104-*b*, a laptop 104-*c* or a server 104-*d*. In other cases, the user device 104 may be another computing system. In some cases, the user device 104 may be operated by a user or group of users. The user or group of users may be a customer, associated with a business, a manufacturer, or any other appropriate organization.

Cloud platform 106 may offer an on-demand database service to the cloud client 102. In some cases, cloud platform 106 may be an example of a multi-tenant database system. In this case, cloud platform 106 may serve multiple cloud clients 102 with a single instance of software. However, other types of systems may be implemented, including—but not limited to—client-server systems, mobile device systems, and mobile network systems. In some cases, cloud platform 106 may support an online application. This may include support for sales between buyers and sellers operating user devices 104, service, marketing of products posted by buyers, community interactions between buyers and sellers, analytics, such as user-interaction metrics, applications (e.g., computer vision and machine learning), and the Internet of Things (IoT). Cloud platform 106 may receive data associated with generation of an online environment from the cloud client 102 over network connection 114, and may store and analyze the data. In some cases, cloud platform 106 may receive data directly from a user device 104 and the cloud client 102. In some cases, the cloud client 102 may develop applications to run on cloud platform 106. Cloud platform 106 may be implemented using remote servers. In some cases, the remote servers may be located at one or more data centers 108.

Data center 108 may include multiple servers. The multiple servers may be used for data storage, management, and processing. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes. In some cases, the data stored at data center 108 may be backed up by copies of the data at a different data center (not pictured).

Server system 110 may include cloud clients 102, a cloud platform 106, an AI voice interaction component 118, and a data center 108 that may coordinate with cloud platform 106 and data center 108 to implement an online environment. In some cases, data processing may occur at any of the components of server system 110, or at a combination of these components. Thus, the voice interaction component 118 may be included in the user device 104, server system 110, or in part or in whole in both. In some cases, servers may perform the data processing. The servers may be a cloud client 102 or located at data center 108.

Some or all of the functionality attributed to the voice interaction component 118 may be embodied or performed by one or more user devices 104, one or more components of server system 110 (e.g., cloud clients 102, a cloud platform 106, and/or a data center 108), and/or other components of system 100. The voice interaction component 118 may receive signals and inputs from user device 104 directly. via cloud clients 102, and/or via cloud platform 106 or data center 108.

As described herein, some implementations of the voice interaction component 118 may facilitate adaptive AI voice interactions by dynamically adjusting voice characteristics, interaction pacing, and conversational patterns based on caller demographics and context. The voice interaction component 118 may receive call metadata, including caller identification data and audio signals, from user devices 104 or cloud clients 102 via network connections 112 or 114. The metadata may be processed to define a caller profile, which may include parameters for tailoring voice output and interaction flow. The voice interaction component 118 may generate audio output with tailored voice characteristics and conversational patterns, and may evaluate interaction data during the call to determine a disposition score. A disposition score may be associated with a difficulty of a conversation for a caller (e.g., a difficulty score). Based on the disposition score, the voice interaction component 118 may continue AI voice agent interaction or escalate the call to a human operator. Some implementations may distribute processing tasks across user devices 104, cloud clients 102, cloud platform 106, and data center 108 to support real-time adjustments and decision-making during voice interactions.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
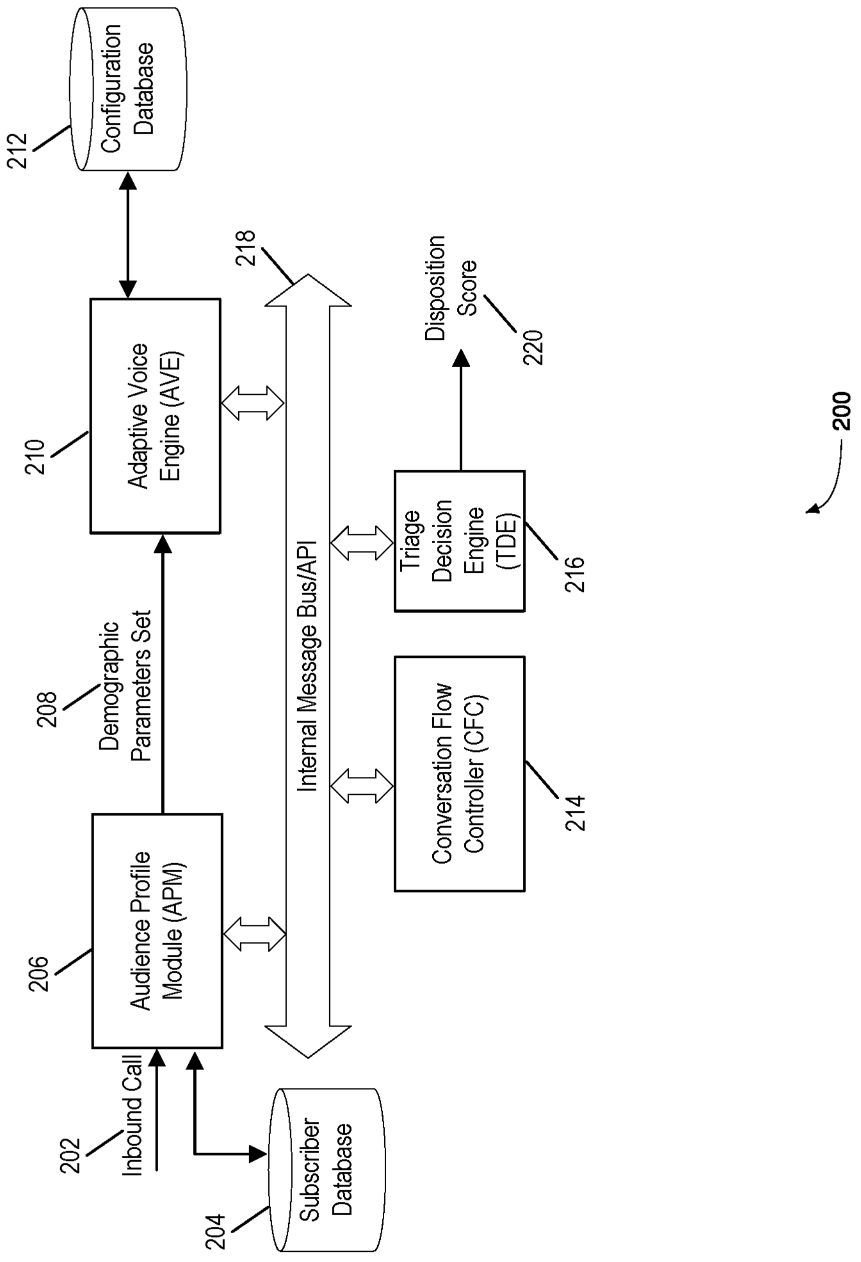
FIG. 2 shows system architecture diagram which supports techniques for adapting AI voice interactions based on caller demographics and context in accordance with various aspects of the present disclosure.

FIG. 2 shows system architecture diagram 200 which supports techniques for adapting AI voice interactions based on caller demographics and context in accordance with various aspects of the present disclosure. As depicted in FIG. 2, the system architecture diagram 200 may include one or more of an inbound call 202, a subscriber database 204, an audience profile module (APM) 206, a demographic parameter set 208, an adaptive voice engine (AVE) 210, a configuration database 212, a conversation flow controller (CFC) 214, a triage decision engine (TDE) 216, an internal message bus/API 218, a disposition score 220, and/or other components.

The inbound call 202 may include telephony data and metadata necessary for initiating the interaction process. The inbound call 202 may originate from various sources, such as a medical alert device, a standard telephone, or a mobile application. The inbound call 202 may include information such as the caller's phone number, device type, and call initiation timestamp. The inbound call 202 may interact with the audience profile module (APM) 206 to determine caller characteristics. In some implementations, the inbound call 202 may be received through SIP trunking, cloud telephony APIs, or WebRTC-based systems.

The subscriber database 204 may store structured demographic profiles and associated caller information indexed by identifiers such as phone numbers. The subscriber database 204 may include fields such as demographic classification labels, preferred voice and interaction parameters, and historical interaction data. The subscriber database 204 may interact with the audience profile module (APM) 206 to retrieve demographic profiles for incoming calls. In some implementations, the subscriber database 204 may support caregiver-configurable settings to allow authorized users to update or override stored parameters.

The audience profile module (APM) 206 may determine caller characteristics and generate a demographic profile object based on available data sources. The audience profile module (APM) 206 may analyze data such as automatic number identification (ANI), real-time voice biometrics, and contextual signals from originating devices. The audience profile module (APM) 206 may interact with the adaptive voice engine (AVE) 210 to provide demographic parameter sets for voice synthesis. In some implementations, the audience profile module (APM) 206 may default to a conservative parameter set when classification confidence is low.

The demographic parameter set 208 may represent a structured collection of values tailored to the identified caller's demographic profile. The demographic parameter set 208 may include parameters such as pitch, speech rate, pause duration, vocabulary complexity, and prosodic contours. Prosodic contours may refer to patterns of pitch, rhythm, stress, and intonation across utterances that convey meaning, emphasis, and emotional tone beyond the literal words, and may include features such as rising or falling pitch patterns at sentence boundaries, stress placement on key words, and rhythmic timing between syllables. The demographic parameter set 208 may be loaded into the adaptive voice engine (AVE) 210 to configure voice synthesis for the interaction. In some implementations, the demographic parameter set 208 may be interpolated between predefined profiles to accommodate mixed or nuanced demographic signals.

The adaptive voice engine (AVE) 210 may adjust voice synthesis parameters such as pitch, speech rate, and intonation based on the demographic parameter set. The adaptive voice engine (AVE) 210 may utilize a parametric synthesis pipeline to generate audience-adaptive audio output. The adaptive voice engine (AVE) 210 may interact with the conversation flow controller (CFC) 214 to ensure synchronized adjustments during the interaction. In some implementations, the adaptive voice engine (AVE) 210 may support both neural TTS architectures and concatenative synthesis systems.

The configuration database 212 may store predefined parameter profiles for various demographic groups and interaction scenarios. The configuration database 212 may include records containing vectors of numeric and categorical values for parameters such as prosodic contours and phoneme duration. The configuration database 212 may interact with the adaptive voice engine (AVE) 210 to provide parameter sets for voice synthesis. In some implementations, the configuration database 212 may support updates to stored profiles based on adaptive feedback from ongoing interactions.

The conversation flow controller (CFC) 214 may govern the logical structure and pacing of the interaction based on the demographic parameter set. The conversation flow controller (CFC) 214 may adjust dimensions such as patience thresholds, turn-taking timing, and confirmation loops. The conversation flow controller (CFC) 214 may interact with the triage decision engine (TDE) 216 to align interaction flow with disposition outcomes. In some implementations, the conversation flow controller (CFC) 214 may activate a conversational mode flag for extended social engagement.

The triage decision engine (TDE) 216 may determine the disposition of the interaction by analyzing multiple input streams and generating a disposition score. The triage decision engine (TDE) 216 may process data such as transcribed caller speech, acoustic distress signals, and interaction metadata. The triage decision engine (TDE) 216 may interact with the internal message bus/API 218 to communicate escalation decisions to other subsystems. In some implementations, the triage decision engine (TDE) 216 may classify non-emergency needs and activate corresponding AI sub-flows.

The internal message bus/API 218 may facilitate communication and data exchange between the system's primary subsystems in real time. The internal message bus/API 218 may support low-latency data transfer to ensure synchronized operation of components such as the adaptive voice engine (AVE) 210 and the conversation flow controller (CFC) 214. The internal message bus/API 218 may interact with the subscriber database 204 to retrieve demographic profiles during call initiation. In some implementations, the internal message bus/API 218 may support modular upgrades to individual subsystems without disrupting overall functionality.

The disposition score 220 may represent a composite evaluation of the interaction's context and content to guide resolution or escalation decisions. The disposition score 220 may be derived from weighted sub-scores based on input streams such as emergency keywords, acoustic distress signals, communication difficulty indicators, and caller silence events. Each sub-score may be normalized to a common scale (e.g., 0.0 to 1.0) and combined using configurable weights to produce the composite disposition score. The disposition score 220 may interact with the triage decision engine (TDE) 216 to determine whether to escalate the call to a human operator, for example, when the disposition score exceeds a predefined escalation threshold (e.g., 0.7 on a normalized scale). In some implementations, the disposition score 220 may include thresholds configurable for specific deployment contexts, such as medical alert services, where lower thresholds may be appropriate to ensure faster escalation for potentially vulnerable callers.

In some implementations, an inbound call 202 may initiate the process by transmitting metadata to the audience profile module (APM) 206, which may query the subscriber database 204 to retrieve demographic information. If the subscriber database 204 does not contain relevant data, the APM 206 may perform real-time voice biometric analysis and incorporate contextual signals to generate a demographic parameter set 208. This demographic parameter set 208 may then be transmitted to the adaptive voice engine (AVE) 210, which may access the configuration database 212 to load corresponding voice synthesis parameters.

In some implementations, the adaptive voice engine (AVE) 210 may apply the demographic parameter set 208 to adjust pitch, speech rate, pause duration, and other voice characteristics before generating synthesized audio output. The conversation flow controller (CFC) 214 may simultaneously govern the pacing and structure of the interaction, adapting conversational timing and complexity based on the demographic parameter set 208. The triage decision engine (TDE) 216 may continuously monitor interaction data, including transcribed speech and acoustic signals, to determine whether escalation to a human operator is necessary. All subsystems may communicate through the internal message bus/API 218, which may facilitate real-time updates and coordination during the call. The final disposition score 220 may reflect the outcome of the interaction, including whether escalation occurred or the call was resolved by the AI system.

Figure 3:
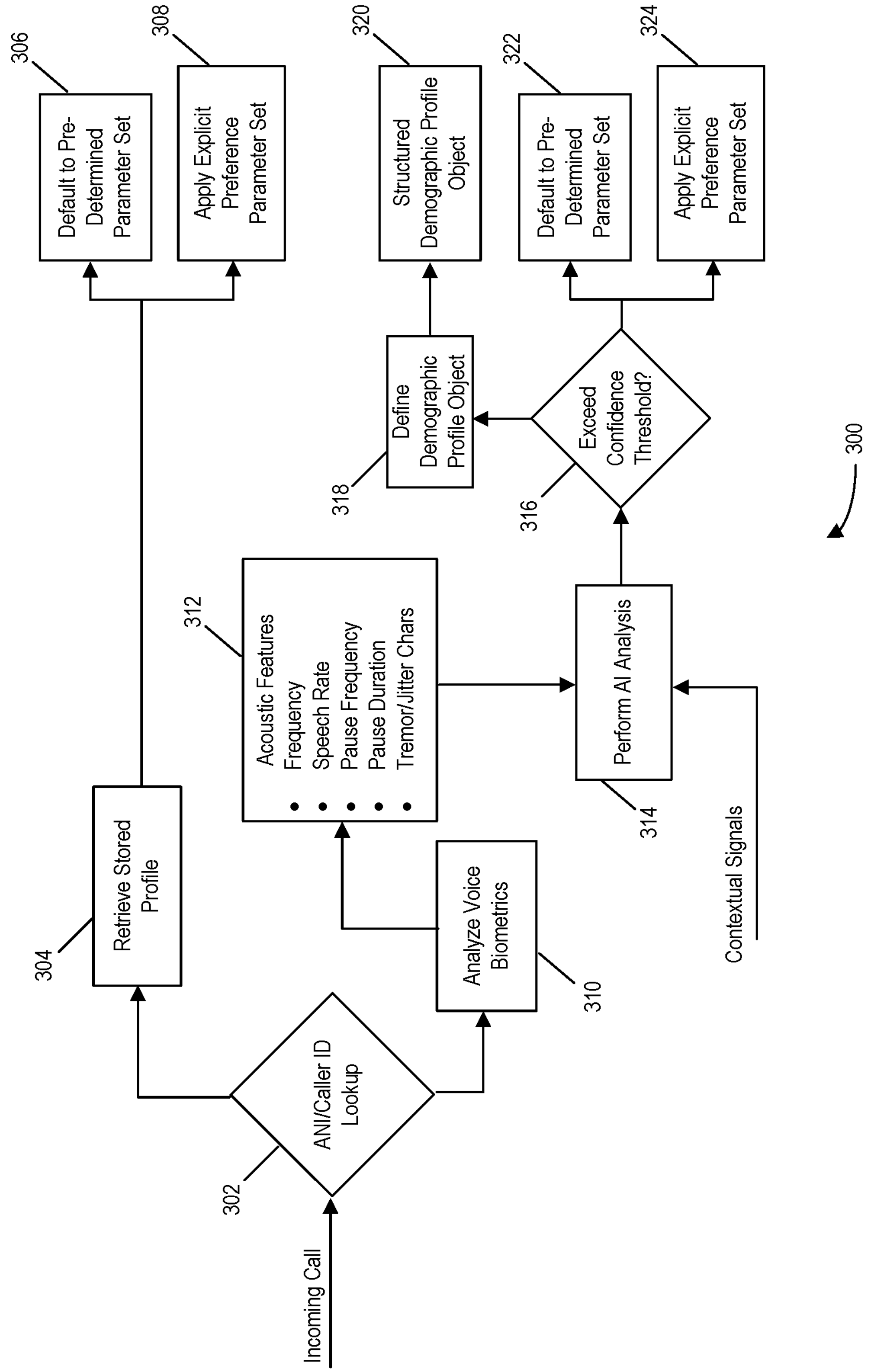
FIG. 3 illustrates a flow diagram of a process that supports techniques for adapting AI voice interactions based on caller demographics and context in accordance with various aspects of the present disclosure.

FIG. 3 illustrates a diagram of a process 300 that supports techniques for adapting AI voice interactions based on caller profiles/demographics and context in accordance with various aspects of the present disclosure. Operations illustrated in the process 300 may involve various components to support operations for analyzing caller data to generate a structured demographic profile object that informs adaptive voice interaction parameters.

At operation 302, process 300 may perform an ANI/caller ID lookup to identify caller information based on an incoming call. In some implementations, the ANI/caller ID lookup may match the incoming phone number to a subscriber record in, for example, a database. Operation 304 may involve querying a low-latency database to support rapid identification of the caller. The identified caller information may include a unique subscriber ID that links to a corresponding demographic profile. In some implementations, the lookup may return additional metadata, such as the caller's subscription type, service history, demographic information, medical information, or the like.

At operation 304, process 300 may retrieve stored demographic profile information associated with an inbound call and/or a caller associated with a telephone number. In some implementations, the stored demographic profile information may include data such as the caller's age, preferred communication style, and known medical conditions. This information may be stored in a structured format indexed by the caller's phone number or device identifier. The stored demographic profile information may be retrieved in real time to ensure that the most recent updates are used during the interaction. In some implementations, the stored demographic profile information may include caregiver-configured settings that specify interaction preferences for the caller. In implementations related to ECCs, the demographic profile information may include call history, call frequency, and/or the nature of prior calls (e.g., health issues, fire, poison, nuisance, etc.).

At operations 306 and 308, process 300 may select between alternative speech parameter configurations based on available caller data. At operation 306, the process may default to a conservative/universal AI voice agent speech parameter set when demographic classification confidence is low or when no stored caller profile exists. The conservative/universal parameter set may include a moderate speech rate (e.g., 140-160 words per minute), neutral pitch within an accessible frequency range, standard vocabulary at approximately an eighth-grade reading level, extended pause durations (e.g., 1.5-2.0 seconds between prompts), and clear enunciation patterns designed to maximize intelligibility across diverse caller populations. At operation 308, the process may alternatively apply a pre-determined (e.g., previously established) preference parameter set retrieved from a stored caller profile when such a profile exists and has been validated against the incoming caller identification data.

At operation 310, process 300 may perform real-time voice biometric analysis to assess caller characteristics. In some implementations, the voice biometric analysis may use machine learning models to determine the caller's likely demographic group, such as elderly, pediatric, or general adult. Operation 310 may evaluate acoustic features such as fundamental frequency variance and speech rhythm to infer demographic attributes and extract acoustic features 312 including, but not limited to, frequency, speech rate, pause frequency, pause duration, voice tremor/jitter characteristics, or the like. In the context of voice analysis, jitter may refer to cycle-to-cycle variations in fundamental frequency, while shimmer may refer to cycle-to-cycle variations in amplitude, and these metrics may be quantified using measures such as percentage jitter, absolute jitter in microseconds, and shimmer in decibels. Elevated jitter and shimmer values may be indicative of vocal instability associated with aging, emotional arousal, fatigue, or certain medical conditions affecting vocal motor control. The system may differentiate between age-related tremor patterns, which may exhibit consistent low-frequency oscillations (e.g., in the 4-8 Hz range) with gradual onset across the interaction, and distress-related vocal instability, which may present as sudden increases in jitter and shimmer values correlated with elevated pitch variance and irregular speech rhythm, by analyzing the temporal progression and co-occurrence of these acoustic markers during the call. Process 300 may assign confidence scores to the assessed characteristics to indicate the reliability of the analysis. In some implementations, the voice biometric analysis may incorporate contextual signals, such as the type of device initiating the call, to refine the assessment.

At operation 314, process 300 may apply the acoustic features 312 to one or more AI agents, AI models, large language models (LLMs), and/or machine learning algorithms to perform AI analysis of the incoming call to determine demographic attributes, according to an embodiment. In some implementations, the AI agents may include a trained machine learning classifier and may include models such as gradient boosted decision trees or neural networks. The AI agents may process features such as speech rate, pause frequency, and prosodic patterns to determine demographic labels in addition to the contextual signals (e.g., time of call, mobile device manufacturer, etc.). The demographic attributes may include age group, cognitive ability indicators, or communication style preferences. In some implementations, the AI agents may output a probabilistic label with a confidence score for each demographic attribute. Individual confidence scores may be used to define a demographic profile. In one embodiment, the confidence scores of multiple attributes may be aggregated into a single score or confidence levels that may be used to define a demographic profile.

At operation 316, process 300 compares the confidence level to a threshold, according to an embodiment. The threshold may be defined based on prior call analyses, arbitrarily (e.g., initially), and/or based on 50-60 percent confidence, for example. If the confidence threshold is exceeded, operation 316 may proceed to operation 318. Otherwise, operation 316 may proceed to operation 322 and/or operation 324.

At operation 318, process 300 may define a structure demographic profile object 320 for use by one or more AI voice agents based on the analyzed data, if one or more acoustic features or characteristics exceed a confidence threshold, in accordance with aspects of the disclosure. In some implementations, the structure demographic profile object 320 may include a vector of parameter values corresponding to the caller's identified characteristics and/or acoustic features. The structured demographic profile object at 320 may specify interaction parameters such as speech rate, vocabulary complexity, and turn-taking timing. The structure demographic profile object 320 may be formatted for compatibility with downstream modules, such as an adaptive voice engine, as disclosed herein. In some implementations, the structure demographic profile object 320 may include fallback parameters for cases where certain attributes could not be determined, for example.

If the one or more acoustic features or characteristics is under the confidence threshold, operation 316 may proceed to operation 322 and/or operation 324, according to an embodiment. Process 300 may proceed to operation 322 to use a conservative/default speech parameter set or may proceed to operation 324 to apply a pre-determined preference parameter set, in accordance with aspects of the disclosure.

Figure 4:
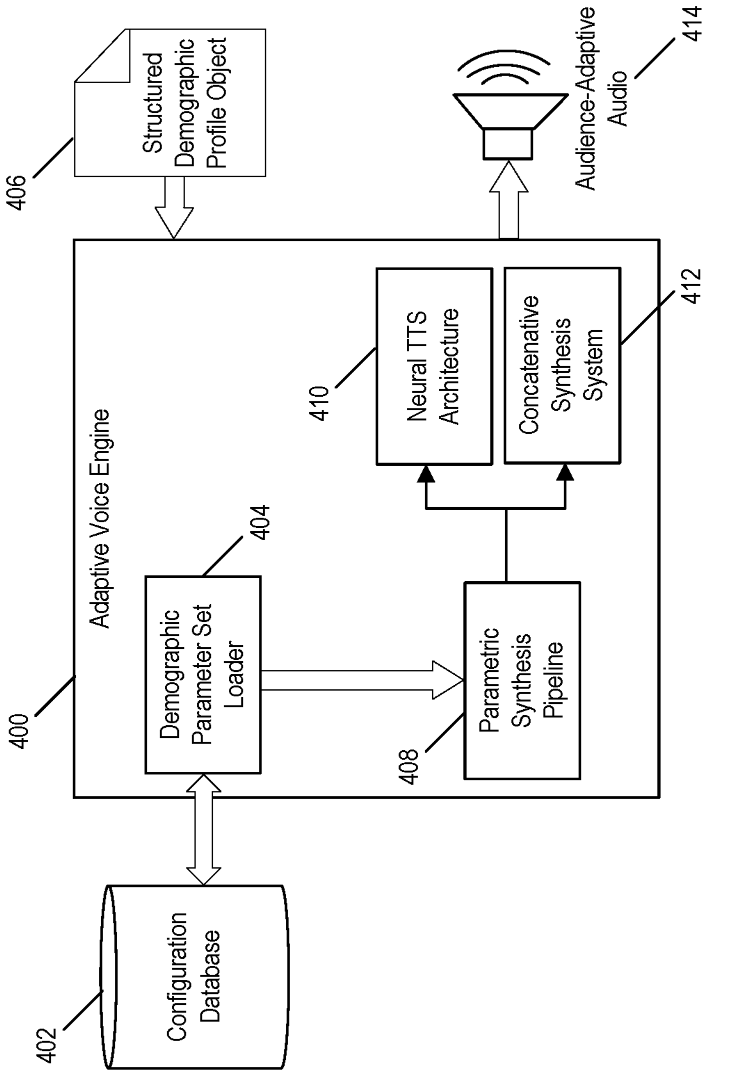
FIG. 4 shows adaptive voice engine which supports techniques for adapting AI voice interactions based on caller demographics and context in accordance with various aspects of the present disclosure.

FIG. 4 shows an adaptive voice engine 400 that supports techniques for adapting AI voice agent interactions based on caller profiles and context in accordance with various aspects of the present disclosure. Adaptive voice engine 400 is an example implementation of adaptive voice engine 210 (shown in FIG. 2). As depicted in FIG. 4, the adaptive voice engine 400 may be communicatively coupled to a configuration database 402, may include a demographic parameter set loader 404, and may receive a structured demographic profile object 406. Adaptive voice engine 400 may include a parametric synthesis pipeline 408, a neural TTS architecture 410, and a concatenative synthesis system 412 to support generating audience-adaptive audio 414, according to embodiments of the disclosure. The adaptive voice engine 400 may select between the neural TTS architecture 410 and the concatenative synthesis system 412 based on factors such as required audio quality, available computational resources, and latency constraints. For example, the neural TTS architecture 410 may be preferred for generating high-quality, natural-sounding speech with nuanced prosodic variations, while the concatenative synthesis system 412 may be selected when lower latency is required or when pre-recorded audio segments are available that closely match the desired output characteristics. In some implementations, the parametric synthesis pipeline 408 may coordinate the selected synthesis approach and apply post-processing to ensure consistent output quality regardless of the underlying synthesis method.

The configuration database 402 may include stored demographic parameter sets for various caller profiles. For example, a caller with a voice profile associated with a person in their 70's may prefer a deeper voice and slower speech cadence than someone in their 30's. Based on feedback from hundreds or thousands of callers, the AI agents may determine that some caller profiles prefer (e.g., respond better to) a female voice over a male voice, or vice-versa. Such configuration settings may be stored in configuration database 402 to quickly upload an AI agent parameters that are likely to help a caller feel comfortable and less-alarmed. Similar feedback-based training may occur for other parameters, such as the pitch of the AI agent voice, the volume (e.g., loud, medium, soft) of the AI agent voice, the cadence, pause duration, and the like. These additional parameters may be stored and referenced from the configuration database. In some implementations, the configuration database 402 may be the same as or similar to the configuration database 212, as described herein.

The demographic parameter set loader 404 may retrieve and load parameter values from the configuration database 402 based on the structured demographic profile object 406. The structured demographic profile 406 may be at least partially defined according to process 300 and may be similar to structured demographic profile 320 (shown in FIG. 3). In some implementations, the demographic parameter set loader 404 may be used to import the demographic parameter set 208, as described herein. The structured demographic profile object 406 may represent caller-specific profile or demographic information determined through pre-registered profiles or real-time analysis.

The parametric synthesis pipeline 408 may process the demographic parameter set to adjust voice output characteristics dynamically. In some implementations, the parametric synthesis pipeline 408 may include logic for incorporating specific parameters into AI voice agents.

The neural Text-to-Speech (TTS) architecture 410 may generate synthesized speech conditioned on the demographic parameter set for enhanced voice adaptation. Neural TTS architecture 410 is a structural design of AI systems that can be used to convert written text into human-like speech. Unlike older "concatenative" systems that stitched together pre-recorded snippets of audio, neural TTS may be configured to use deep learning to generate audio from scratch, for example.

The concatenative synthesis system 412 may apply prosody post-processing to align voice output with the demographic parameter set. Prosody processing or prediction can be used to decide the rhythm, pitch, and stress of a voice and can be used to determine if a sentence sounds like a question or a statement.

The audience-adaptive audio 414 may represent the final synthesized voice output tailored to the caller's demographic profile. The audience-adaptive audio 414 may be output over a communications channel during, for example, a telephone call to at least partially automate telephone calls to an emergency communications center (ECC). The telephone call may be made to an administrative line, a non-emergency line, or an emergency line (e.g., 911) of an ECC or other type of public safety answering point (PSAP). Other types of PSAPs include but are not limited to police stations, a county sheriff's office, a fire department dispatch, a "metro 911" center that serves multiple agencies/cities, or the like.

Figure 5:
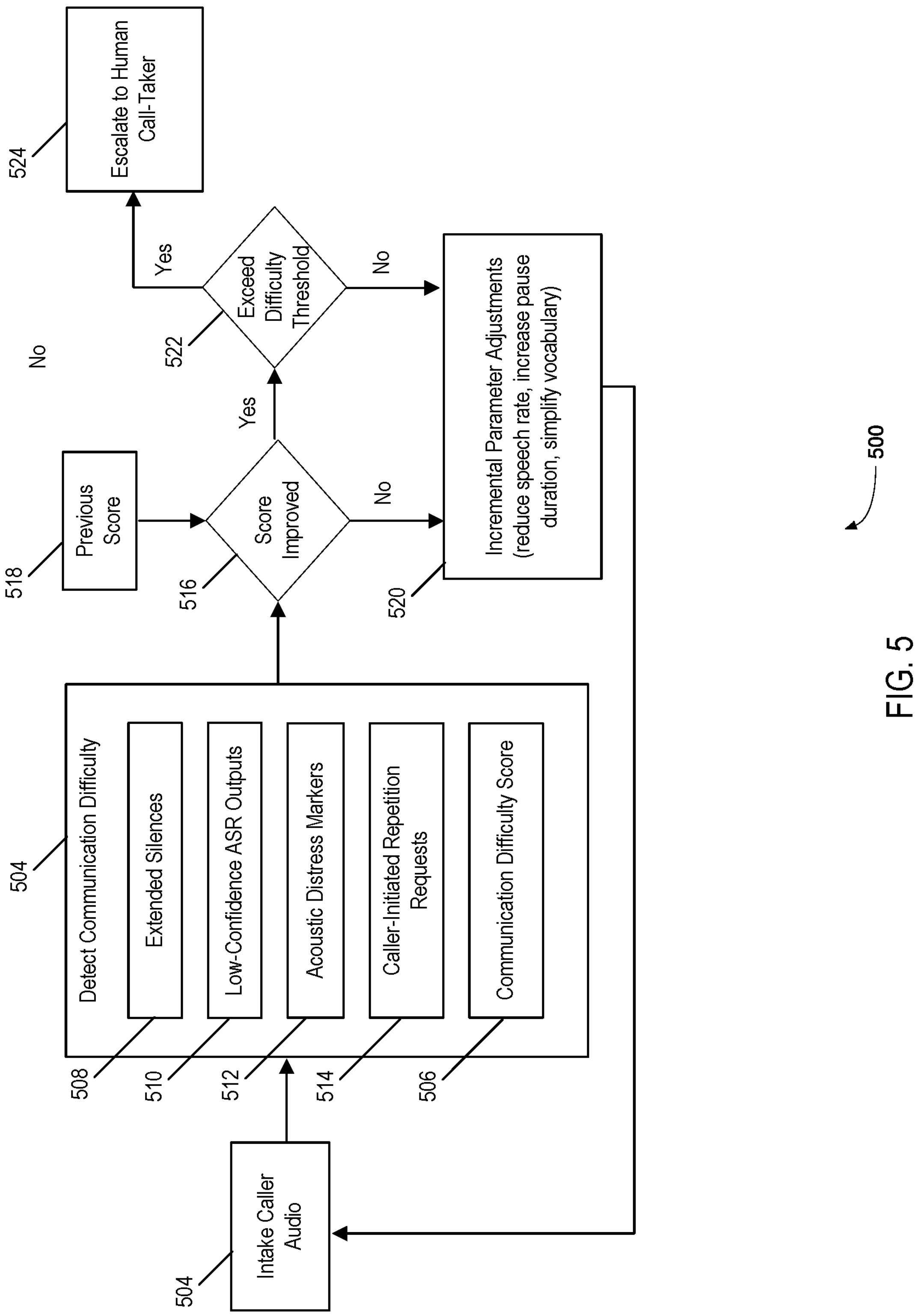
FIG. 5 illustrates a flow diagram of a process that supports techniques for adapting AI voice interactions based on caller demographics and context in accordance with various aspects of the present disclosure.

FIG. 5 illustrates a flow diagram process 500 for adaptive feedback that supports techniques for adapting AI voice interactions based on caller profiles/demographics and context in accordance with various aspects of the present disclosure. Process 500 includes a number of operations for dynamically adjusting interaction parameters to improve communication and escalate persistent difficulties when necessary.

At operation 502, process 500 intakes caller audio, according to an embodiment. Intaking caller audio can include setting up a conference room and redirecting a call to an ECC to the conference room. Intaking caller audio can include copying and transmitting session initiation protocol (SIP) audio data to a server hosting or accessing one or more AI agents configured to analyze audio. The AI agents may be configured to generate audio responses that are responsive to the caller audio.

At operation 504, process 500 detects communication difficulty, according to an embodiment. The detected communication difficulty may be quantified by generating a communication difficulty score 506. An AI agent or AI model may be used to determine the communication difficulty score based on instructions provided to the AI agent. The communication difficulty score may be based on various characteristics extracted from the caller audio including, for example, extended silences 508 (e.g., longer than 2 seconds), low-confidence automated speech recognition (ASR) outputs 510, acoustic distress markers 512 (e.g., sighing), and/or caller-initiated repetition requests 514. In the world of AI voice agents, low-confidence ASR may refer to a state where the speech-to-text engine is unsure if its transcription of a user's spoken words is accurate. Features such as acoustic noise, phonetic ambiguity, out-of-vocabulary (OOV) words, accents, and/or dialects, for example. Every time an AI agent "hears" or receives audio, the ASR engine may generate a confidence score (typically a value between 0.0 and 1.0). If that score falls below a pre-defined threshold (e.g., 0.6 or 60%), the system/agent may flag the portion of the communication as "low confidence."

At operation 516, process 500 determines if the communication difficulty score improves over a previous communication difficult score 518, according to an embodiment. If the score is not improved, operation 516 may proceed to operation 520. Otherwise, operation 516 may proceed to operation 522, according to an embodiment.

At operation 520, process 500 incrementally adjusts one or more parameters, according to an embodiment. Process 500 may return to operation 504 to continue monitoring the interaction with the adjusted parameters. The feedback loop between operations 504, 516, 520, and 522 may continue iteratively until one of several termination conditions is met: (1) the communication difficulty score improves below a satisfactory threshold indicating successful adaptation, (2) the call is escalated to a human operator at operation 524, (3) the call concludes naturally through caller-initiated termination or successful resolution of the caller's needs, or (4) a maximum number of adjustment iterations is reached, at which point the system may escalate to a human operator regardless of the current difficulty score.

At operation 522, process 500 determines if the communication difficulty score exceeds a difficulty threshold, according to an embodiment. An example of a difficulty threshold is 0.6 on a scale of 0.0 to 1.0. If the communication difficulty score 506 meets or is under the difficulty threshold, process 500 may proceed to operation 520. If the communication difficulty score 506 exceeds the threshold, process 500 may proceed to operation 524.

At operation 524, process 500 escalates (e.g., forwards the call) to a human call-taker, according to an embodiment. Escalating a call to a human call-taker may include connecting a human call-taker to a conference call room that the caller and AI agent are communicating within, for example.

Figure 6:
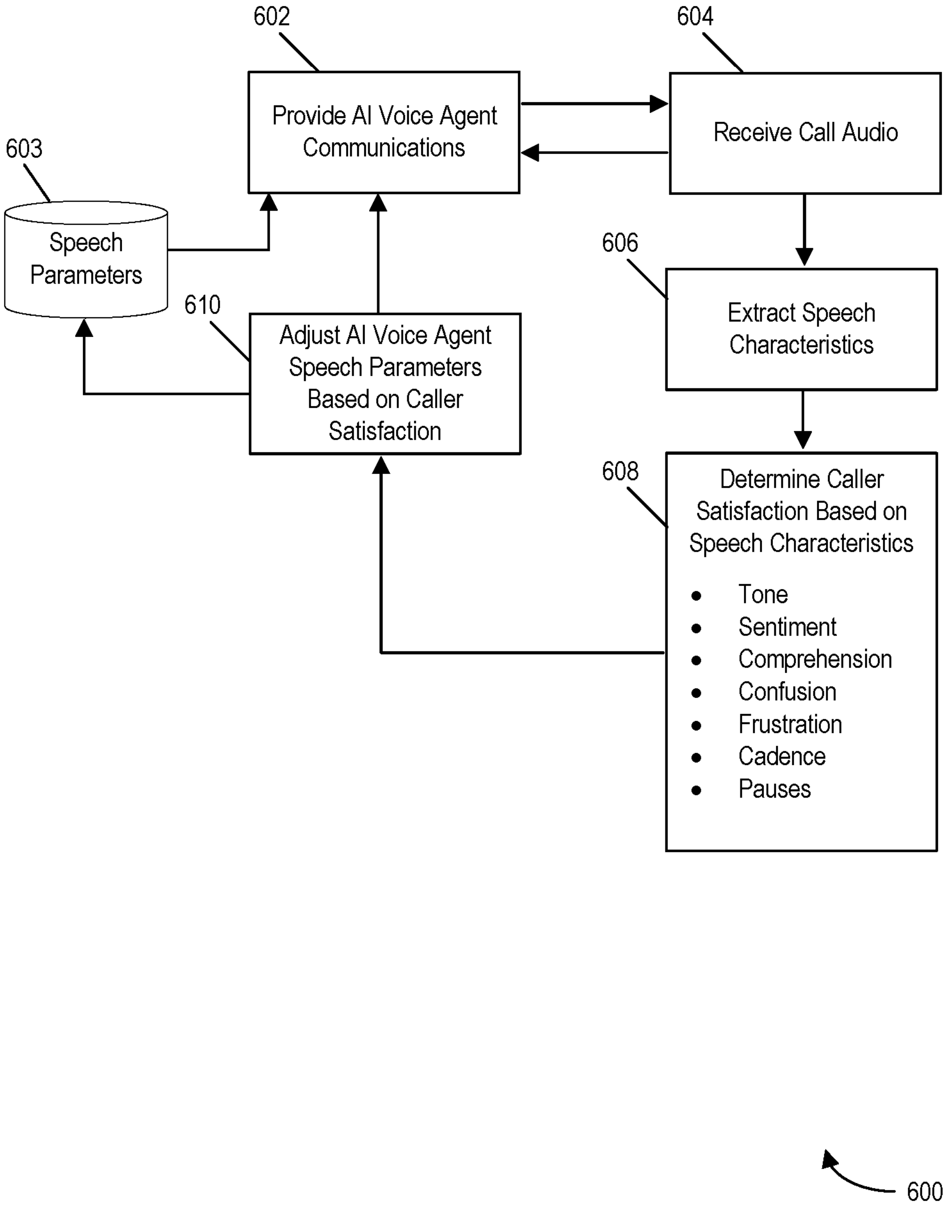
FIG. 6 illustrates a flow diagram of a process that supports techniques for adapting AI voice interactions based on caller demographics and context in accordance with various aspects of the present disclosure.

FIG. 6 illustrates a flow diagram of a process 600 that supports techniques for adapting AI voice interactions based on caller demographics and context in accordance with various aspects of the present disclosure. Process 600 includes a number of operations that may be used to generate adaptive audio with one or more AI agents and/or AI voice agents, according to an embodiment. Process 600 may utilize a speech parameters data structure 603, which may serve as a shared data store that is read from and written to by multiple operations within the process. The speech parameters data structure 603 may contain current values for voice synthesis parameters such as pitch, speech rate, volume, pause duration, and vocabulary complexity, and may be initialized with default or caller-profile-specific values at the start of the process and updated dynamically as the process adjusts parameters based on caller feedback during the interaction.

At operation 602, process 600 provides an AI voice agent communications, according to an embodiment. The AI voice agent communications may be based on speech parameters stored in a speech parameters data structure 603 (e.g., a database, a table, etc.). In one embodiment, process 600 may provide AI voice agent communications in response to a user activating a medical alert device (e.g., a panic button, medical biometrics, fall detection, etc.). A telecommunications channel may be established between the user and the AI voice agent by, for example, calling a user's telephone number or smart home device to initial voice communications between the user/caller and the AI voice agent. In some implementations, an event that triggers the initiation of AI voice agent communications may include a user/caller calling an ECC (e.g., calling 911, calling a non-emergency line, etc.).

At operation 604, process 600 receives call audio from a caller, according to an embodiment. The call audio may be captured as a real-time audio stream transmitted over a telephony channel using standard codec formats (e.g., G.711, G.729, or Opus) and may be buffered in short intervals to support continuous processing by downstream analysis components, according to an embodiment. In some implementations, the system may apply preprocessing to the incoming audio, including noise filtering, echo cancellation, and gain normalization, to improve the quality of the audio signal prior to speech characteristic extraction. The system may further detect and adapt to varying audio quality levels or connection types (e.g., landline, cellular, or VOIP) by adjusting sensitivity thresholds for speech recognition and feature extraction to maintain consistent analysis accuracy across different telephony environments, according to an embodiment.

At operation 606, process 600 extracts speech characteristics from the call audio, according to an embodiment. The speech characteristics may include fundamental frequency, formant frequencies, speech rate, jitter, shimmer, and harmonic-to-noise ratio, which may be indicative of the caller's age, emotional state, and vocal health, according to an embodiment. In some implementations, the system may apply signal processing algorithms and machine learning models, such as trained neural network classifiers or spectral analysis pipelines, to extract and classify the speech characteristics from the audio signal in real time. The extracted speech characteristics may be structured as a feature vector and stored in a temporary data structure associated with the active call session for use by downstream components, such as the caller satisfaction determination at operation 608, according to an embodiment.

At operation 608, process 600 determines caller satisfaction based on the speech characteristics (e.g., tone, sentiment, comprehension, confusion, frustration, cadence, pauses, etc.), according to an embodiment. In some implementations, the system may compute a caller satisfaction score by applying weighted combinations of the extracted speech characteristics, where each characteristic (e.g., frustration level, pause frequency, speech cadence irregularity) may contribute to a sub-score that is aggregated into a composite satisfaction metric, according to an embodiment. The system may employ trained machine learning classifiers, such as support vector machines or recurrent neural networks trained on labeled interaction datasets, and sentiment analysis models to classify the caller's emotional state and infer satisfaction levels from the acoustic and linguistic features of the call audio, according to an embodiment. The caller satisfaction determination may be updated continuously throughout the duration of the call by evaluating successive audio segments at defined intervals rather than as a single point-in-time assessment, enabling the system to detect changes in caller satisfaction in real time and trigger corresponding adjustments to the AI voice agent's speech parameters, according to an embodiment.

At operation 610, process 600 adjusts AI voice agent speech parameters based on the caller satisfaction, according to an embodiment. Operation 610 may include updating a speech parameters data structure 603, according to an embodiment. The parameters that may be adjusted may include pitch, speech rate, volume, pause duration, and vocabulary complexity, where for example a decrease in detected caller satisfaction may cause the system to lower the speech rate, increase pause duration, simplify vocabulary, and adjust pitch to a warmer register, according to an embodiment. In some implementations, the magnitude of each parameter adjustment may correlate with the degree of detected dissatisfaction, such that a minor decrease in the caller satisfaction score may trigger incremental parameter changes while a significant decrease may trigger larger adjustments or a combination of simultaneous parameter modifications, according to an embodiment. The system may implement a feedback loop in which, after applying the adjusted speech parameters, the system continues to monitor subsequent caller audio segments to determine whether the adjustments have improved the caller satisfaction score and, if the satisfaction score does not improve or continues to decline, the system may apply further refinements to the speech parameters or escalate the call to a human operator, according to an embodiment.

Figure 7:
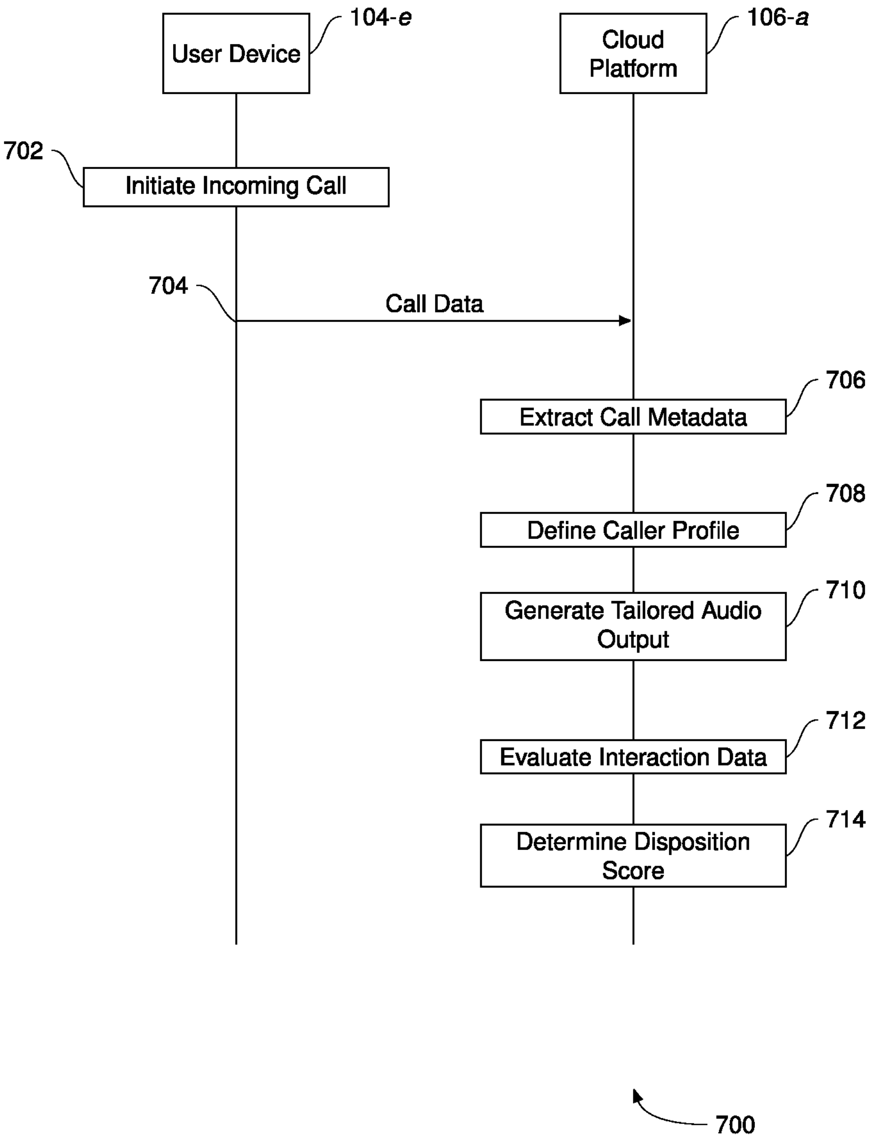
FIG. 7 illustrates an example of a process flow that supports adapting AI voice interactions based on caller demographics and context in accordance with various aspects of the present disclosure.

FIG. 7 illustrates an example of a process flow 700 that supports adapting AI voice interactions based on caller demographics and context in accordance with aspects of the present disclosure. In some examples, the process flow 700 may implement aspects of the system 100. For example, the process flow 700 may include a user device 104-*e* and a cloud platform 106-*a*, which may be examples of corresponding devices described herein. In some implementations, a user device 104-*e* initiates an incoming call to an emergency or non-emergency line, and a cloud platform 106-*a* processes the call by utilizing AI voice agents to extract metadata, define a caller profile, generate tailored audio output, and evaluate interaction data to determine whether to continue AI interaction or escalate the call to a human operator.

At 702, the user device 104-*e* may initiate an incoming call to an emergency or non-emergency line. For example, the user device 104-*e* may trigger the call through a telephony API integrated with a medical alert system. In some implementations, the user device 104-*e* may initiate the call based on a physical button press on a wearable device or a voice command detected by the device's onboard microphone. The user device 104-*e* may transmit metadata, such as the caller's phone number or device identifier, to the cloud platform 106-*a* as part of the call initiation process.

At 704, the user device 104-*e* may transmit call data, including caller identification data and audio signals, to the cloud platform 106-*a*. For example, the user device 104-*e* may send audio signals that include the caller's speech patterns, which may be analyzed by the cloud platform 106-*a* to infer demographic characteristics. In some implementations, the user device 104-*e* may transmit metadata such as the device type or location information, which may assist the cloud platform 106-*a* in determining contextual signals relevant to the call. The user device 104-*e* may also include pre-configured user preferences in the transmitted data, which may influence how the cloud platform 106-*a* processes the interaction.

At 706, the cloud platform 106-*a* may extract call metadata, including caller identification data and audio signals, from the incoming call. For example, the cloud platform 106-*a* may analyze the caller identification data to match the incoming call to a pre-existing subscriber profile stored in a database. In some implementations, the cloud platform 106-*a* may process the audio signals to detect acoustic features such as speech rate, pitch, and pauses, which may assist in determining demographic characteristics. The cloud platform 106-*a* may also extract contextual signals, such as the originating device type or location metadata, to refine the demographic profile associated with the call.

At 708, the cloud platform 106-*a* may define a caller profile of the caller based on the caller identification data and the audio signals, the caller profile may include parameters for voice characteristics and interaction pacing. For example, the cloud platform 106-*a* may analyze the audio signals to detect speech rate, pitch, and pause duration, which may help determine the caller's demographic characteristics. In some implementations, the caller profile may include additional parameters such as vocabulary complexity preferences or prosodic contour patterns tailored to the inferred demographic. The cloud platform 106-*a* may store the caller profile temporarily during the interaction to allow for real-time adjustments based on detected difficulty signals.

At 710, the cloud platform 106-*a* may generate audio output with tailored voice characteristics, interaction pacing, and conversational patterns based on the caller profile using one or more AI voice agents. For example, the cloud platform 106-*a* may adjust the pitch and tone of the audio output to align with the caller's demographic profile, such as selecting a warmer and lower-pitched voice for elderly callers. In some implementations, the cloud platform 106-*a* may modify the speech cadence to accommodate slower cognitive processing speeds, such as reducing the words per minute for callers identified as elderly or cognitively impaired. The cloud platform 106-*a* may incorporate conversational elements, such as extended pauses or simplified sentence structures, to match the inferred communication preferences of the caller.

At 712, the cloud platform 106-*a* may evaluate interaction data during the call to determine a disposition score. For example, the cloud platform 106-*a* may analyze transcribed caller speech to detect keywords or phrases indicative of emergency situations, such as "chest pain" or "fallen." In some implementations, the cloud platform 106-*a* may assess acoustic features, including elevated pitch variance or irregular speech rhythm, to identify signs of distress. The cloud platform 106-*a* may incorporate metadata from the interaction, such as the frequency of repeated prompts or extended silences, to refine the disposition score.

At 714, the cloud platform 106-*a* may determine whether the disposition score may trigger continued interaction by the one or more AI voice agents or escalation of the incoming call to a human operator. For example, the cloud platform 106-*a* may analyze the frequency of difficulty signals, such as repeated clarification requests or extended silences, to assess whether the AI voice agents may continue the interaction effectively. In some implementations, the cloud platform 106-*a* may evaluate the presence of emergency keywords or acoustic distress markers, such as elevated pitch or irregular breathing, to determine if escalation to a human operator may be necessary. The cloud platform 106-*a* may incorporate contextual signals, such as the originating device type or subscriber profile, to refine the decision-making process for continued interaction or escalation.

Figure 8:
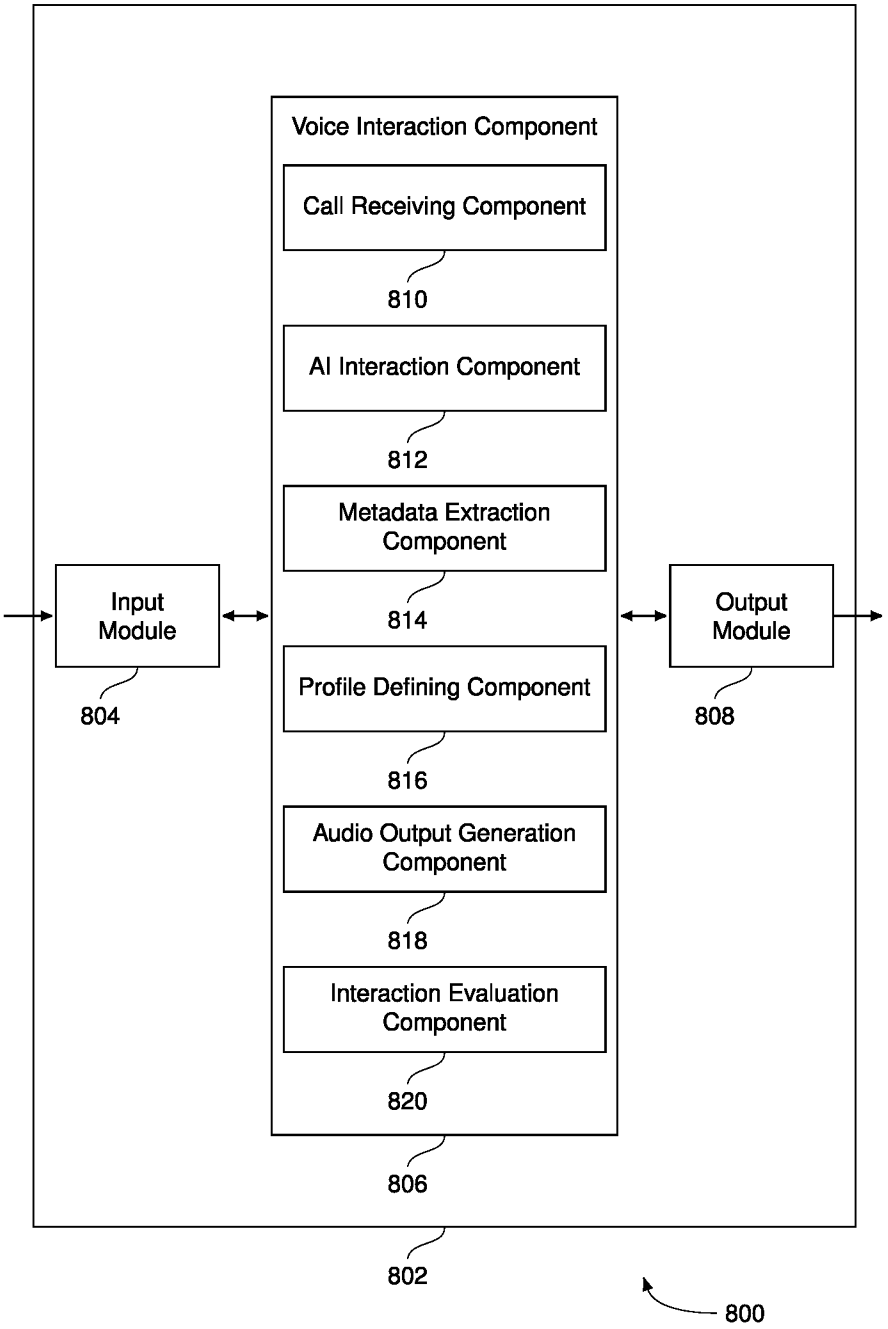
FIG. 8 shows a block diagram of an apparatus that supports adapting AI voice interactions based on caller demographics and context in accordance with various aspects of the present disclosure.

FIG. 8 shows a block diagram 800 of an apparatus 802 that supports adapting AI voice interactions based on caller demographics and context in accordance with various aspects of the present disclosure. The apparatus 802 may include an input module 804, voice interaction component 806, and an output module 808. The apparatus 802 may also include a processor. Each of these components may be in communication with one another (e.g., via one or more buses). In some cases, the apparatus 802 may be an example of a user terminal, a database server, or a system containing multiple computing devices.

The input module 804 may manage input signals for the apparatus 802. For example, the input module 804 may identify input signals based on an interaction with a modem, a keyboard, a mouse, a touchscreen, or a similar device. These input signals may be associated with user input or processing at other components or devices. In some cases, the input module 804 may utilize an operating system such as iOS®, ANDROID®, MS-DOS®, MS-WINDOWS®, OS/2®, UNIX®, LINUX®, or another known operating system to handle input signals. The input module 804 may send aspects of these input signals to other components of the apparatus 802 for processing. In some cases, the input module 804 may be a component of an input/output (I/O) controller 1006 as described with reference to FIG. 10.

The voice interaction component 806 may include one or more of a call receiving component 810, an AI interaction component 812, a metadata extraction component 814, a profile defining component 816, an audio output generation component 818, an interaction evaluation component 820, and/or other components. The voice interaction component 806 may be an example of aspects of the voice interaction component 902 or 1004 described with reference to FIGS. 9 and 10.

The call receiving component 810 may be configured as or otherwise support a means for receiving an incoming call to an emergency line or a non-emergency line of an ECC. The AI interaction component 812 may be configured as or otherwise support a means for initiating AI voice agent interaction with a caller during the incoming call using one or more AI voice agents. The metadata extraction component 814 may be configured as or otherwise support a means for extracting call metadata, including caller identification data and audio signals, from the incoming call with the one or more AI voice agents. The profile defining component 816 may be configured as or otherwise support a means for defining a caller profile of the caller based on the caller identification data and the audio signals, wherein the caller profile may include parameters for voice characteristics and interaction pacing. The audio output generation component 818 may be configured as or otherwise support a means for generating audio output with tailored voice characteristics, interaction pacing, and conversational patterns based on the caller profile. The interaction evaluation component 820 may be configured as or otherwise support a means for evaluating interaction data during the call to determine a disposition score, wherein the disposition score may trigger either continued interaction by the one or more AI voice agents or escalation of the incoming call to a human operator.

The output module 808 may manage output signals for the apparatus 802. For example, the output module 808 may receive signals from other components of the apparatus 802, such as the voice interaction component 806, and may transmit these signals to other components or devices. In some specific examples, the output module 808 may transmit output signals for display in a user interface, for storage in a database or data store, for further processing at a server or server cluster, or for any other processes at any number of devices or systems. In some cases, the output module 808 may be a component of an I/O controller 1006 as described with reference to FIG. 10.

Figure 9:
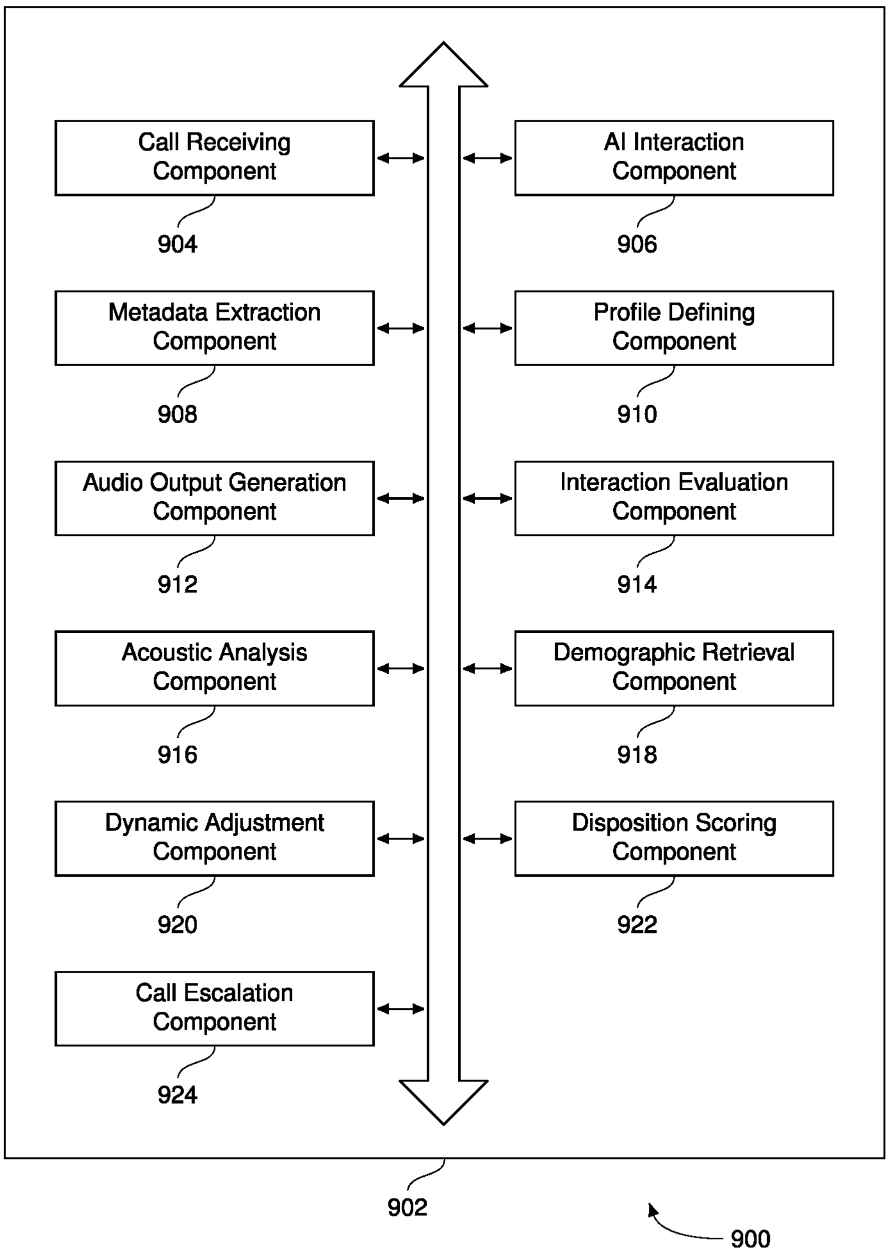
FIG. 9 shows a block diagram of an AI voice interaction component that supports adapting AI voice interactions based on caller demographics and context in accordance with various aspects of the present disclosure.

FIG. 9 shows a block diagram 900 of an AI voice interaction component 902 that supports adapting AI voice interactions based on caller demographics and context in accordance with various aspects of the present disclosure. The voice interaction component 902, or various components thereof, may be an example of means for performing various aspects of adapting AI voice interactions based on caller demographics and context as described herein. For example, the voice interaction component 902 may include one or more of a call receiving component 904, an AI interaction component 906, a metadata extraction component 908, a profile defining component 910, an audio output generation component 912, an interaction evaluation component 914, an acoustic analysis component 916, a demographic retrieval component 918, a dynamic adjustment component 920, a disposition scoring component 922, a call escalation component 924, and/or other components. Each of these components may communicate, directly or indirectly, with one another (e.g., via one or more buses).

The call receiving component 904 may be configured as or otherwise support a means for receiving, by a server, an incoming call to an emergency line or a non-emergency line of an ECC. In some implementations, the call receiving component 904 may process calls initiated through a telephony API, such as SIP trunking, to establish a connection with the ECC. The call receiving component 904 may further handle calls originating from various devices, including mobile phones, landlines, or IoT-enabled devices like medical alert pendants. The call receiving component 904 may determine the type of line being contacted based on the dialed number information (DNIS) included in the incoming call metadata.

The AI interaction component 906 may be configured as or otherwise support a means for initiating AI voice agent interaction with a caller during the incoming call using one or more AI voice agents. In some implementations, the AI interaction component 906 may initiate interaction by selecting a voice agent profile tailored to the caller's demographic profile, such as an elderly-friendly voice with slower speech and warmer tones. The AI interaction component 906 may further determine the appropriate conversational pacing by referencing pre-configured parameters stored in a demographic profile database. In some implementations, the AI interaction component 906 may adjust the voice agent's vocabulary complexity to align with the caller's inferred cognitive abilities or communication preferences. The AI interaction component 906 may initiate interaction by presenting simplified menu options to the caller, such as limiting prompts to two choices per interaction cycle. In some implementations, the AI interaction component 906 may dynamically modify the voice agent's intonation and prosody to match generational communication norms, such as reducing uptalk for elderly callers.

The metadata extraction component 908 may be configured as or otherwise support a means for extracting, from the incoming call with the one or more AI voice agents, call metadata including caller identification data and audio signals. In some implementations, the metadata extraction component 908 may determine the caller identification data by analyzing Automatic Number Identification (ANI) or caller ID information embedded in the incoming call metadata. In some implementations, the metadata extraction component 908 may extract audio signals by capturing the initial few seconds of the caller's speech for subsequent analysis. In some implementations, the metadata extraction component 908 may process additional metadata fields such as the dialed number information (DNIS) to infer the type of service line being contacted. In some implementations, the metadata extraction component 908 may extract acoustic features from the audio signals, such as pitch, speech rate, and pause duration, for demographic classification. In some implementations, the metadata extraction component 908 may determine whether the incoming audio signals contain background noise levels that could affect subsequent processing steps.

The profile defining component 910 may be configured as or otherwise support a means for defining, by the server, a caller profile of the caller based on the caller identification data and the audio signals, the caller profile may include parameters for voice characteristics and interaction pacing. In some implementations, the profile defining component 910 may determine voice characteristics such as pitch and timbre to align with demographic preferences inferred from the caller's speech patterns. In some implementations, the profile defining component 910 may define interaction pacing parameters by analyzing the caller's speech rate and pause duration to adjust conversational timing dynamically. In some implementations, the profile defining component 910 may incorporate additional parameters such as prosodic contours to match generational communication norms identified in the caller's demographic profile.

The audio output generation component 912 may be configured as or otherwise support a means for generating, by the one or more AI voice agents, audio output with tailored voice characteristics, interaction pacing, and conversational patterns based on the caller profile. In some implementations, the audio output generation component 912 may determine voice characteristics such as pitch and timbre to align with generational communication norms identified in the caller profile. In some implementations, the audio output generation component 912 may adjust speech cadence to accommodate slower cognitive processing speeds inferred from the caller's demographic classification. In some implementations, the audio output generation component 912 may incorporate conversational pauses of varying durations to match the caller's inferred response timing preferences. In some implementations, the audio output generation component 912 may generate audio output with prosodic contours that reflect a warmer or more familiar tone for elderly callers. In some implementations, the audio output generation component 912 may modify sentence structures to include simpler vocabulary and shorter phrases based on the caller's cognitive or linguistic needs.

The interaction evaluation component 914 may be configured as or otherwise support a means for evaluating, by the one or more AI voice agents, interaction data during the call to determine a disposition score, the disposition score may trigger either continued interaction by the one or more AI voice agents or escalation of the incoming call to a human operator. In some implementations, the interaction evaluation component 914 may determine the disposition score by analyzing the frequency of repeated clarification requests made by the caller during the interaction. In some implementations, the interaction evaluation component 914 may evaluate the disposition score based on acoustic markers of distress, such as elevated pitch variance or irregular speech rhythm detected in the caller's audio. Irregular speech rhythm may be detected by measuring variability in inter-word intervals, inconsistent syllable timing, abnormal pause distributions within utterances, and deviations from expected speech cadence patterns, and the system may quantify rhythm irregularity using metrics such as the coefficient of variation of syllable durations or the standard deviation of inter-stress intervals. In some implementations, the interaction evaluation component 914 may determine the disposition score by monitoring the duration of caller silences that exceed a pre-configured threshold, which may indicate difficulty in responding. In some implementations, the interaction evaluation component 914 may incorporate metadata from the call, such as the originating device type or service line, to refine the disposition score based on contextual factors.

In some examples, the acoustic analysis component 916 may be configured as or otherwise support a means for analyzing the audio signals to extract acoustic features including fundamental frequency, speech rate, pause duration, and tremor characteristics, and classifying the caller into a demographic category based on a probabilistic model trained on these features. In some implementations, the acoustic analysis component 916 may determine additional features such as jitter and shimmer to assess voice stability, which may be indicative of age-related vocal characteristics. In some implementations, the acoustic analysis component 916 may analyze the harmonic-to-noise ratio in the audio signals to infer vocal strain or clarity, which may contribute to demographic classification. In some implementations, the acoustic analysis component 916 may process variations in speech rhythm, such as irregular pauses or elongated syllables, to refine the demographic categorization.

In some examples, the demographic retrieval component 918 may be configured as or otherwise support a means for retrieving a stored demographic profile associated with the caller identification data from a database and merging the retrieved demographic profile with the caller profile to refine the parameters for voice characteristics and interaction pacing. In some implementations, the demographic retrieval component 918 may determine whether the stored demographic profile includes specific preferences for conversational tone, such as a preference for a formal or casual speaking style. In some implementations, the demographic retrieval component 918 may retrieve historical interaction data linked to the caller identification data to infer patterns in prior communication preferences, such as a tendency to request slower speech or repeated confirmations. In some implementations, the demographic retrieval component 918 may determine whether the stored demographic profile includes language preferences, such as a preference for simplified vocabulary or specific regional dialects.

In some implementations, the demographic retrieval component 918 may further support comparison of acoustic features extracted during the current call with acoustic features stored from one or more previous calls by the same caller to detect changes in the caller's vocal characteristics over time. The historical acoustic feature data retrieved from the database may include baseline values for fundamental frequency, speech rate, pause patterns, tremor characteristics, jitter, shimmer, and harmonic-to-noise ratio that were recorded and stored during prior interactions with the same caller. The system may compute deviation metrics by comparing the current call's extracted acoustic features against the stored historical baseline, such as by calculating the percentage change in mean fundamental frequency relative to the caller's prior average, the difference in words-per-minute output compared to the caller's historical speech rate norm, or the variance in tremor amplitude relative to values recorded in prior interactions. If one or more of the computed deviation metrics exceed configurable thresholds, the system may infer that the caller's health status or cognitive state may have changed since prior interactions. For example, a significant increase in vocal tremor amplitude or frequency compared to the caller's historical baseline may indicate progression of a neurological condition, while a marked decrease in speech rate combined with increased pause frequency relative to historical norms may signal fatigue, illness, or cognitive decline. In response to detecting such deviations, the system may increase the disposition score to favor earlier escalation to a human operator, generate an alert to a designated caregiver or emergency contact associated with the caller profile, log the detected change for clinical or administrative review, or adjust the AI voice agent's conversational approach to provide additional support, such as by further reducing speech rate, increasing patience thresholds, and simplifying vocabulary relative to the parameters that were used in prior interactions with the caller.

In some examples, the dynamic adjustment component 920 may be configured as or otherwise support a means for dynamically adjusting the tailored voice characteristics, interaction pacing, and conversational patterns during the call in response to detecting difficulty signals including repeated clarification requests, extended silences, or low-confidence speech recognition outputs. In some implementations, the dynamic adjustment component 920 may reduce the speech rate incrementally when repeated clarification requests are detected to accommodate callers who may process information more slowly. In some implementations, the dynamic adjustment component 920 may increase the duration of conversational pauses to allow additional time for the caller to respond when extended silences are identified. In some implementations, the dynamic adjustment component 920 may switch to a simpler vocabulary set when low-confidence speech recognition outputs suggest that the caller may not understand complex phrasing. In some implementations, the dynamic adjustment component 920 may adjust the prosodic contours of the voice output to create a more reassuring tone if difficulty signals indicate potential caller distress. In some implementations, the dynamic adjustment component 920 may activate a confirmation loop to repeat and verify critical information when repeated clarification requests are detected during the interaction.

In some examples, the disposition scoring component 922 may be configured as or otherwise support a means for determining the disposition score by evaluating interaction data including transcribed caller speech for emergency keywords, acoustic distress signals, and metadata that may be related to caller behavior during the interaction. In some implementations, the disposition scoring component 922 may determine whether transcribed caller speech includes phrases such as "help me" or "I can't breathe" by referencing a curated keyword lexicon. In some implementations, the disposition scoring component 922 may analyze the semantic similarity of caller speech to predefined emergency scenarios, such as descriptions of falls or medical symptoms. In some implementations, the disposition scoring component 922 may evaluate acoustic distress signals by detecting elevated pitch variance or irregular breathing patterns in the caller's audio. In some implementations, the disposition scoring component 922 may determine whether the caller's speech rhythm includes elongated pauses or abrupt changes in tone that could indicate distress. In some implementations, the disposition scoring component 922 may analyze metadata such as the frequency of repeated clarification requests or extended silences during the interaction to infer potential communication challenges. In some implementations, the disposition scoring component 922 may determine whether the metadata includes contextual indicators, such as the originating device type or service line, that may correlate with specific caller needs or behaviors.

In some examples, the call escalation component 924 may be configured as or otherwise support a means for escalating the incoming call to a human operator by creating a conference bridge that may connect the caller, the one or more AI voice agents, and the human operator, while transferring contextual data that may include the caller profile and interaction summary. In some implementations, the call escalation component 924 may determine whether the conference bridge should include additional participants, such as a caregiver or emergency contact, based on the caller profile. In some implementations, the call escalation component 924 may transfer contextual data that may include acoustic markers of distress detected during the interaction, such as elevated pitch variance or irregular breathing patterns. In some implementations, the call escalation component 924 may determine whether to include a real-time transcription of the interaction as part of the contextual data to assist the human operator in understanding the caller's needs. In some implementations, the call escalation component 924 may adjust the timing of the conference bridge creation to ensure that the human operator is connected at a moment when the caller is actively engaged in the interaction.

Figure 10A:
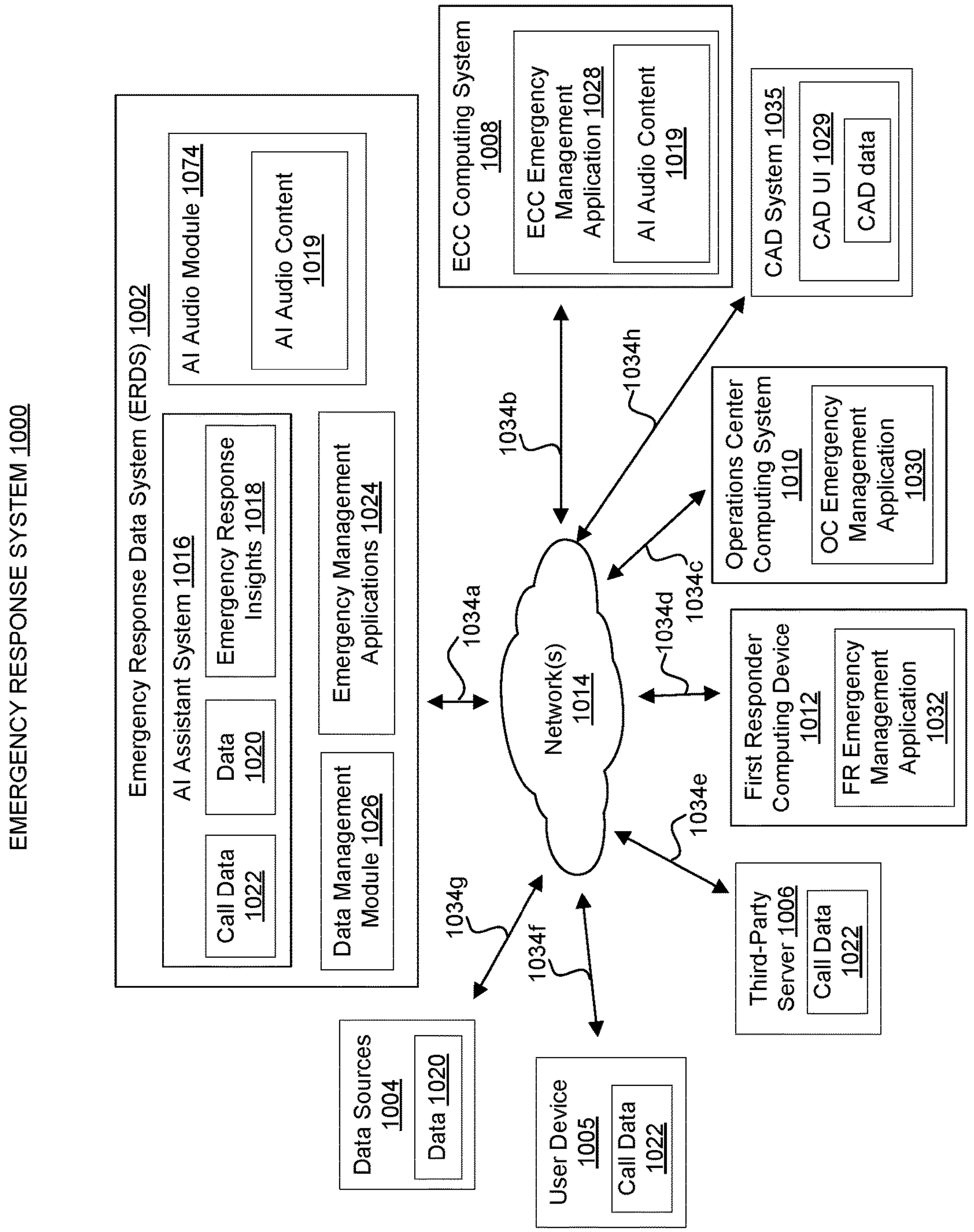
FIGS. 10A and 10B show diagrams of an emergency response system in accordance with various aspects of the present disclosure.
Figure 10B:
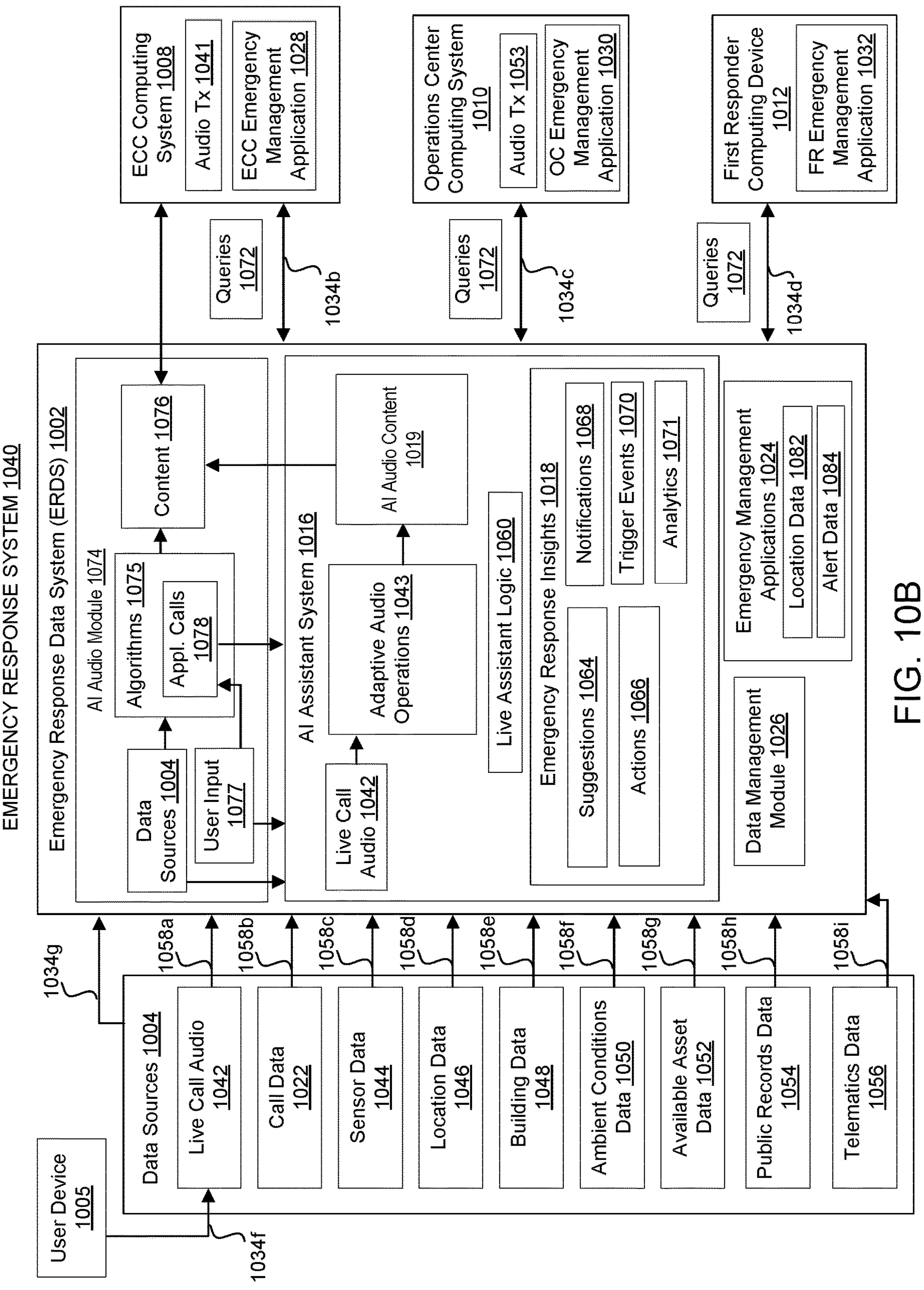

FIGS. 10A and 10B illustrate example embodiments of an emergency response system that is operable to provide audience-adaptive AI voice agent content in accordance with aspects of the disclosure. FIG. 10A illustrates a diagram of an emergency response system 1000 that includes an emergency response data system (ERDS) 1002 that is communicatively coupled to a number of data sources 1004, a user device 1005, a third-party server 1006, an ECC computing system 1008, an operations center (OC) computing system 1010, a first responder computing device 1012, and/or a CAD system 1035 through one or more networks 1014, according to an embodiment. ERDS 1002 is a data processing server that may be implemented as a cloud platform (e.g., cloud platform 106) and/or server system, according to an embodiment. Networks 1014 may include a number of wired networks, wireless networks, network components, and infrastructure. A number of communications channels 1034 (individually, 1034*a*, 1034*b*, 1034*c*, 1034*d*, 1034*e*, 1034*f*, 1034*g*, and 1035*h*) may communicatively couple the various components of emergency response system 1000.

Emergency response data system 1002 includes an artificial intelligence (AI) assistant system 1016 that is configured to support various types of AI voice agent generation of audience-adaptive of emergency communications, according to an embodiment. AI assistant system 1016 receives live call audio, analyzes the live call audio content, and selectively adapts outgoing audio content based on the caller's voice characteristics to provide AI audio content 1019 to the ERDS 1002, according to embodiments of the disclosure. AI assistant system 1016 may at least partially perform operations to support an AI audio module 1074 that is operable to provide logic and/or algorithms that support the delivery of AI voice agent content. AI assistant system 1016 may interact with external data sources through an MCP interface.

Emergency response data system 1002 is also operable to generate emergency response insights 1018 and/or AI audio content 1019 from data 1020 and call data 1022, according to an embodiment. AI assistant system 1016 is operable to determine characteristics of call data 1022, perform various validation operations based on the call data, and aggregate the characteristics (e.g., keywords, call summary, etc.) with data 1020, according to an embodiment. AI assistant system 1016 is operable to analyze the aggregated characteristics with data 1020 to generate emergency response insights 1018 and/or AI audio content 1019, according to an embodiment. AI assistant system 1016 and/or emergency response data system 1002 may then provide emergency response insights 1018 to ECC computing system 1008, operations center computing system 1010, first responder computing device 1012 and/or CAD system 1035 for incident handling and/or receipt by emergency responders and/or emergency management personnel. The emergency response insights 1018 may be at least partially incorporated into AI audio content 1019.

Emergency response data system 1002 is configured to host and/or support a number of emergency management applications 1024 that are accessed by and/or operated by ECC computing system 1008, operations center computing system 1010, and/or first responder computing device 1012, according to embodiments of the disclosure. Emergency response data system 1002 may be implemented with one or more servers that may be distributed across multiple data centers. Emergency management applications 1024 may be implemented on/in emergency response data system 1002 as web-based applications that are accessed via a web browser, a webhook, a persistent webhook, and/or one or more secure connections. Emergency management applications 1024 may be configured to process, push, and/or receive data to/from a mobile application or an operating system (OS) specific application that is downloaded to and operated by a particular computing system or device (e.g., a first responder smart phone). Data 1020 and call data 1022 may be retrieved, received, managed, and directed to AI assistant system 1016 and/or emergency management applications 1024 with a data management module 1026 to support generating and delivering emergency response insights 1018.

The various computing systems that receive emergency response insights 1018 are tools that may be used by emergency response personnel, emergency responders, and/or AI agents to dispatch, communicate about, and respond to incidents and emergencies that are represented by or in data 1020 and/or call data 1022, according to an embodiment. ECC computing system 1008 represents a computing system (e.g., a terminal, a server, a personal computer, a laptop, etc.) operated at or for an ECC. ECC computing system 1008 is configured to operate or provide an ECC emergency management application 1028. ECC emergency management application 1028 may be communicatively coupled to emergency response data system 1002 to receive emergency response insights 1018, data 1020, and/or call data 1022. ECC emergency management application 1028 may be configured with a graphical user interface to visually represent emergency events and incidents (e.g., using maps, queues, icons, data cards, etc.) and to enable emergency response personnel (e.g., 911 dispatchers, telecommunicators, etc.) to dispatch and communicate emergency events. ECC emergency management application 1028 displays summaries/transcripts of AI audio content 1019 that is at least partially generated with AI audio module 1074 and/or AI assistant system 1016, in accordance with aspects of the disclosure.

Operations center computing system 1010 represents a computing system (e.g., a terminal, a server, a personal computer, a laptop, etc.) operated at or for an operations center (e.g., a global operations security center (GSOC), a rail network operations center (NOC), etc.). Operations center computing system 1010 is configured to operate or provide/execute an operations center emergency management application 1030. The operations center emergency management application 1030 is an instance of emergency management applications 1024 that provides a graphical user interface to enable emergency response personnel (e.g., an operator, risk manager, security personnel, etc.) of corporations, other businesses, residences, academic institutions, and/or private entities to have awareness of incidents (e.g., emergency events) that occur on their particular premises or managed premises. In some implementations, an OC emergency management application 1030 displays summaries and/or transcripts of AI audio content 1019 in support of operation center (e.g., GSOC) operations.

First responder computing device 1012 is representative of computing systems, mobile devices, and/or in-vehicle devices used by emergency responders to navigate to, coordinate for, and communicate about emergency events and other incidents, according to an embodiment. The term "first responder" may be used interchangeably with the term "field responder," as used herein. First responder emergency management application 1032 may be operated on or by first responder computing device 1012. First responder emergency management application 1032 is communicatively coupled to emergency response data system 1002 to receive emergency response insights 1018, data 1020, and/or call data 1022 to inform the preparation and response to emergency events, according to an embodiment.

User device 1005 may include a telephone, a smart phone, tablet, a laptop, personal computer, a chrome book, or other computing devices that may be used, to initiate an emergency call (e.g., a 911 call) or to otherwise report an incident (e.g., a text-based message to 911), according to an embodiment. User device 1005 is an example of user device 104 as described with reference to FIG. 1, according to an embodiment. Call data 1022 represents audio data, video, data, images, multimedia messages, location data (e.g., device-based hybrid (DBH) data), and/or text messages provided from user device 1005 to ECC computing system 1008 and/or operations center computing system 1010, according to an embodiment.

Third-party server 1006 may include a telecommunications or device manufacturer server that receives location data, user identification data, and/or call statistics for emergency calls made by user device 1005. Third-party server 1006 may be configured to provide call data 1022 to emergency response data system 1002 to support operation of emergency applications 1024, according to an embodiment. Call data 1022 may include device-based hybrid (DBH) data that may be provided by some telecommunications and/or smartphone companies.

CAD system 1035 is representative of a CAD program that receives CAD data and dispatches field/first responders. The CAD data may be at least partially displayed in CAD UI 1029 and may be extracted, conditioned, and/or reformatted from live call audio and/or using AI audio module 1074, according to an embodiment. Examples of CAD programs include locally installed (e.g., at an ECC) and cloud-based programs such as, PremierOne CAD, Enterprise CAD, CAD Pro, CentralSquare CAD, CAD Pro, Unify, Versaterm CAD, ZOLL Dispatch, and the like.

FIG. 10B illustrates an example block diagram of an emergency response system 1040 that is operable to provide AI audio content 1019 (e.g., summaries, transcripts, etc.) in emergency management applications 1024 (e.g., ECC emergency management application 1028), in accordance with aspects of the disclosure. Emergency response system 1040 is an example implementation of emergency response system 1000, cloud platform 106, server system 110, and/or system 100, in accordance with aspects of the disclosure.

Data sources 1004 may include one or more of a number of data types and data sources that may be used to identify, characterize, analyze or otherwise gain insights about emergency events and other incidents, according to an embodiment. Examples of data sources 1004 include, but are not limited to, live call audio 1042 (e.g., live 911 call audio data), call data 1022, sensor data 1044, location data 1046, building data 1048, ambient conditions data 1050, available asset data 1052 (e.g., air ambulance, drones, AED), public records data 1054, and/or telematics data 1056, according to an embodiment. Live call audio 1042 may be received by emergency response data system 1002 by configuring a call audio transmitter 1041 to forward/provide live call audio 1042, CDR, and/or ANI/ALI data from ECC call handling equipment (e.g., from ECC computing system 1008) and/or by configuring call audio transmitter 1053 to forward/provide live call audio 1042 from GSOC/NOC call handling equipment (e.g., from operations center computing system 1010), for example. Live call audio 1042 may also be routed to the emergency response system 1040 via session initiation protocol (SIP) audio ties into public and/or private telecommunications systems. Live call audio 1042 may also include radio-based dispatches or transcripts of radio-based dispatches of emergencies from an ECC.

Call data 1022 may include call duration, caller name, repeat call statistics, device-based location data, etc. of a call to an ECC or operations center. Call data 1022 may be at least partially retrieved from ECC computing systems and may include ANI (automatic number identification) data, ALI (automatic location identification) data, and/or CDR (call detail record) data. The ANI data is the phone number from which a 911 call or text to 911 originates. ALI data is the location information associated with the ANI data, and the ALI data may be retrieved from a database linked to the ANI data. CDR data is a detailed record of an incoming 911 call and may contain ANI data, the time the call came in, the time it was answered, any transfers, and the trunk number used. The position of a call-taker may also be included in the ANI data and/or the CDR data.

Sensor data 1044 may include, but is not limited to, data received or retrieved from residential buildings, commercial buildings, personal medical devices, personal safety devices, industrial structures, vehicles, crash detectors, smoke alarms, fire alarms, smart cameras, home security devices, moisture detectors, motion detectors, shock detectors, location sensors, gas detectors, pressure sensors, or the like, according to various embodiments of the disclosure.

Various other types of data may be received, acquired, and/or used. Location data 1046 may include a location of a sensor or incident (e.g., DBH location taken from a GPS unit of a smartphone). Building data 1048 may include construction materials, structure age, floorplans, renovation history, electrical schematics, HVAC layout, or the like. Ambient conditions data 1050 may include weather data, weather forecasts, road conditions, wind speeds, visibility, cloud conditions, temperature, or the like. Available asset data 1052 may include, but is not limited to, a number of available drones, a number of available medical devices (e.g., automated external defibrillator), a number of vehicles, a number of sprinklers in a building, or the like. Public records data 1054 may include, but are not limited to, personal property records, arrest records, residential addresses, etc. Telematics data 1056 may include various types of vehicle data, such as accelerometer data, gyroscope data, air bag sensors, vehicle log data, or the like. Additional miscellaneous data source or data types may include social media feeds, new feeds, geofence data, traffic feeds, visual impairment status, auditory impairment status, or the like. The various data sources 1004 may be communicatively coupled to emergency response data system 1002 through a number of communications channels 1058 (individually, 1058*a*, 1058*b*, 1058*c*, 1058*d*, 1058*e*, 1058*f*, 1058*g*, 1058*h*, and 1058*i*), according to embodiments of the disclosure.

AI assistant system 1016 is operable to extract, analyze, condition, and/or format live call audio, CDR data, and/or ANI/ALI data to support generating and providing AI audio content 1019 in accordance with aspects of the disclosure. CDR data may include position of call taker, time of call receipt, time of call answer, duration of call, etc. AI assistant system 1016 is operable as an AI agent, according to an embodiment. AI assistant system 1016 analyzes CDR data, other call data 1022, and/or live call audio 1042 with one or more LLMs, AI models, and/or with machine learning, according to an embodiment. Analysis of live call audio 1042 and/or data sources 1004 may include adaptive audio operations 1043 that utilize AI tools (e.g., LLMs, AI agent, AI models, machine learning, etc.) to perform audio analysis, incident characterization, voice characterization, and/or user dissatisfaction/satisfaction analysis of emergency communications content, according to an embodiment. In some implementations, AI assistant system 1016 generates AI audio content 1019 (e.g., responses or interactions with a caller) based on data sources 1004 (e.g., data received from sensors located near the caller). For example, if a loud background noise is detected near a caller, AI audio content 1019 may have a volume that is increased to help a caller hear the audio content from an AI voice agent.

AI assistant system 1016 may also perform operations based on user input 1077. For example, AI assistant system 1016 may use live call audio 1042 when performing adaptive audio operations 1043 from live call audio 1042, at least partially based upon user selection of options in a dashboard or emergency management application UI.

AI assistant system 1016 may include a number of components to support generating emergency response insights 1018 for display by one or more of ECC emergency management application 1028, operations center emergency management application 1030, and/or first responder emergency management application 1032, according to an embodiment. AI assistant system 1016 may include live assistant logic 1060, which may include aspects of a retrieval, augmentation, generation (RAG) system, to generate emergency response insights 1018 based on call data 1022, data sources 1004, and/or trigger events 1070, in accordance with aspects of the disclosure.

Emergency response insights 1018 may include suggestions 1064, actions 1066, and/or notifications 1068 that are generated in response to one or more trigger events 1070, according to an embodiment. Emergency response insights 1018 may also include analytics 1071 that represent emergency communications statistics handled by an ECC, an operations center, and/or a first responder computing device at a particular location, for a region, and/or for a state or country. Emergency response insights 1018 may also include inferences (e.g., potential cause of an accident, potential health/mental/physical characteristics of an accident victim, etc.) about an emergency communication that may be derived based on LLM training and/or information contained within one or more data sources 1004. Suggestions 1064 may be displayed or transmitted to emergency applications 1024 to provide summaries, suggested actions (e.g., questions that align with SOPs for the particular ECC), additional awareness, or other insights to a dispatcher, telecommunicator, emergency management operator, or first responder, according to an embodiment. Suggestions 1064 may include, but are not limited to, 911 dispatcher codes, responder location, arrival times, pre-arrival instructions for first responders, severity of an incident (e.g., a severity score), live updates to incidents (based on live audio analysis and/or sensor data), medical procedures, documentation (e.g., standard operating procedures), response coordination, incident, characterization, and/or response suggestions, in accordance with various embodiments of the disclosure. Suggestions 1064 may also include AI generated search terms and/or search phrases that are based on historical context of a particular user, spatial context, and/or temporal context, for example. Suggestions 1064 may also include suggested actions, such as show traffic layer, dispatch to a particular location, display video feed layer, provide estimated time of arrival (ETA) of first responders, or other selectable actions. Emergency response data system 1002 may cause one or more suggestions 1064 to be displayed on a user interface of ECC emergency management application 1028, operations center emergency management application 1030, and/or first responder emergency management application 1032, according to various embodiments of the disclosure.

Actions 1066 are examples of actions that AI assistant system 1016 may, in coordination with emergency response data system 1002, initiate to facilitate a response to an emergency event. Actions 1066 may be at least partially performed on the client-side based on client-side emergency data processing that is at least partially supported by client-side resources, such as client-side local LLMs. Actions 1066 may include, but are not limited to, transfer calls (e.g., to an ECC having jurisdictional authority for a call), triage multiple calls (e.g., group, associate, combine, or summarize), call a point of contact (e.g., at a business location of an incident), cluster a group of calls or communications that are related to the same incident, automatedly respond to duplicate calls/texts about an emergency, search for a phone number of a point of contact, communicate with air ambulance server to dispatch an air ambulance, dispatch field responders to a location, display and/or populate protocol forms (e.g., intake protocol, cardiac-arrest protocol, chest pain protocol, drowning protocol, skin burn protocol, etc.), and/or generate a group chat or a group video conference between people who are located near or who are responding to a particular incident, according to various implementations of the disclosure. Actions 1066 may also include actions to manipulate and/or navigate the UI of an ECC or GSOC emergency management application. For example, actions 1066 may include enabling and displaying a particular layer, transmitting a digital request for resources (e.g., dispatching an air ambulance), requesting resources from an adjacent or nearby ECC, and/or sending emergency information to a computer aided dispatch (CAD) system.

Notifications 1068 may include informational content or alerts derived from a combination of the trigger events 1070, live call audio 1042, or other data sources 1004, in accordance with aspects of the disclosure. Notifications 1068 may include displaying particular insights about one or more related incidents, information about changes to an incident (e.g., a change of location, nature of a fire, number of victims, etc.), available asset updates, or the like. Notifications 1068 may include the status of a call, such as "rerouted to ECC xyz."

Trigger events 1070 include events that may serve to initiate the aggregation of data sources 1004, analysis of data sources 1004, and/or the generation of emergency response insights 1018, according to an embodiment. Examples of trigger events 1070 may include, but are not limited to, a 911 call, a call to an ECC non-emergency number, a call to a rail NOC, a call to a GSOC, a text message to 911, a text message to a rail NOC, initiating a videoconference with 911, an activated alarm, a change in sensor data, a change in ambient condition data 1050 (e.g., an abnormal increase or decrease in temperature or moisture in a space), detection of a vehicle accident, airbag deployment, receipt of priority keywords, receipt of a priority assigned to an incident, receipt of a query 1072 from ECC computing system 1008, receipt of a query 1072 from an operations center computing system 1010, and/or receipt of a query from first responder computing device 1012, according to embodiments of the disclosure. Trigger events 1070 may also include telematics data associated with a vehicular accident or incident.

Analytics 1071 include various metrics for communications occurring at an ECC, a region of ECCs, a state of ECCs, one or more operations centers, and/or one or more other first responder devices or stations, in accordance with aspects of the disclosure. Analytics 1071 may also be used to generate supervisor reports that include missing incidents but that may include other information related to call handling (e.g., events that aren't necessarily missed but that occurred during a specified period of time). The metrics can cover areas such as call handling, resource management, and overall operational efficiency. The metrics may also include call answer times, abandonment rates, average handling time, and call volume trends to ensure service levels are being met and identify potential bottlenecks in the system. The metrics may also include incident response times and resource allocation to gauge the efficiency of emergency response coordination. As disclosed herein, AI assistant system 1016 may include one or more AI agents that may be configured to generate visualizations (e.g., charts, graphs, etc.) based on underlying context data, natural language questions, historical datasets, and/or forecasts.

Live assistant logic 1060 includes instructions, scripts, and/or one or more processes that support operations of AI assistant system 1016, according to an embodiment. For example, live assistant logic 1060 may be configured to communicate with AI audio module 1074 and/or a reroute call module to receive and provide data for processing. Access to live assistant logic 1060 may be exposed to an ECC/GSOC end-user through an "ask AI" UI element in a UI for emergency management applications 1024, for example. Live assistant logic 1060 may be configured to provide extracted call characteristics/keywords and/or generated emergency response insights 1018 to emergency management applications 1024, for example. Live assistant logic 1060 may include or provide various application programming interfaces (API) to facilitate receipt of query 1072, according to an embodiment. Live assistant logic 1060 may include decision trees, flow diagrams, instructions, one or more AI agents, one or more large language models (LLMs), machine learning algorithms, or other processes to support live (real-time) interactions with human operators (e.g., call-taker, dispatcher, telecommunicator, operations center operator, first responder, etc.), according to an embodiment. The algorithms may include logic and/or decision trees and/or thresholds for rerouting calls and/or determining which AI agents or AI-based validation agents to use in response to an incoming call.

Live assistant logic 1060 and/or AI assistant system 1016 may be implemented using one or more of a variety of technologies. Live assistant logic 1060 and/or AI assistant system 1016 may be a service that emergency response data system 1002 communicates with remotely or may include a number of libraries and software packages installed onto one or more local or distributed server (e.g., cloud) systems. Live assistant logic 1060 and/or AI assistant system 1016 may be at least partially distributed to a client-side emergency data processing system using, for example, a browser extension, a client-side application, a local LLM, a client-side operating system-based LLM, and/or a client-side networked LLM. Live assistant logic 1060 and/or AI assistant system 1016 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pretrained transformer): a generative model for text-based tasks; and ResNet: a pre-trained deep learning model commonly used for image classification. Live assistant logic 1060 and/or AI assistant system 1016 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

Live assistant logic 1060 and/or AI assistant system 1016 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pretrained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok. In one embodiment, an LLM is trained on historical emergency response data (e.g., 911 call audio, emergency call audio, non-emergency call audio, sensor data, traffic data, weather data, field responder locations, telematics data, public records data, etc.), is operable to support ERDS 1002 operations, and is offered for download as a local LLM to ECC computing system 1008 and/or operations center computing system 1010.

Live assistant logic 1060 and/or AI assistant system 1016 may be at least partially implemented on a computing system that is local to the ECC to reduce latency in data transmission between an ECC and remote data processing servers. For example, live assistant logic 1060 and/or a RAG system may be implemented using a local LLM, allowing: content extraction live call audio and historical ECC data to be received from call handling equipment; on-premises data processing (e.g., image data, audio data, etc.); and low-latency re-insertion of information into the call handling equipment or to an ECC terminal. In accordance with various embodiments of the disclosure, a local implementation of live assistant logic 1060 may include installation in an edge device coupled to an ECC or GSOC network, installation of a local LLM, installation of a local application, and/or local installation of a browser extension that communicates with the local application and/or local LLM, for example.

Emergency management applications 1024 may provide location data 1082 and alert data 1084, in addition to emergency response insights 1018, according to an embodiment. Location data 1082 may include a device-based hybrid (DBH) location of an emergency event. The device-based hybrid location may be derived from call data 1022 and/or may be received from third-party server 1006. The device-based hybrid location may be based on GPS location of user device 1005 or based on registered locations of electronic devices in the vicinity of and communicatively coupled to user device 1005, according to various embodiments. Alert data 1084 may include alerts or notifications that are based on sensor data 1044 and/or one or more additional data sources 1004, according to an embodiment. Location data 1082 and/or alert data 1084 may be provided to and/or displayed by one or more of the emergency management applications 1028, 1030, and/or 1032, according to various embodiments.

Emergency response data system 1002 and AI assistant system 1016 may be configured to be responsive to queries 1072 (e.g., "Ask Harmony", "Ask AI", etc.) that may be entered into and received (from users) through any one of emergency management applications 1028, 1030, and/or 1032. Emergency response data system 1002 and AI assistant system 1016 are configured to be responsive to queries 1072 in the absence of a call-based trigger and/or a data-based trigger, according to an embodiment. Emergency management applications 1028, 1030, and/or 1032 may include a query input text box, may perform audio to text, or may receive and transmit audio to provide queries 1072 to AI assistant system 1016. AI assistant system 1016 may use queries 1072 as a trigger event 1070. AI assistant system 1016 may convert queries 1072 into a semantic vector to perform a vector search of a vector database, a content search of a vector database, and/or a hybrid vector-content search of a vector database. Queries 1072 may include queries related to summaries, graphs, charts, or other visualizations of analytics for an ECC, operations center, and/or first responder device/station, according to an embodiment. AI assistant system 1016 may provide responses to queries 1072 as emergency response insights 1018 and use similar UI elements in graphical user interfaces of emergency management applications 1028, 1030, and/or 1032.

ERDS 1002 includes an AI audio module 1074 that is operable to support defining and providing AI audio content 1019 (e.g., within content 1076) in accordance with aspects of the disclosure. AI audio module 1074 is operable to at least partially provide content 1076 based on user input 1077, data sources 1004, and live call audio 1042, for example. In one embodiment, ERDS 1002 is coupled to a telecommunications network to facilitate AI voice agent communications with a caller (e.g., a 911 caller, a non-emergency line caller, etc.). AI audio module 1074 may use algorithms 1075 to interact with AI assistant system 1016 to define the AI audio content 1019. AI audio module 1074 may include application calls 1078 (e.g., API calls) that interface with AI assistant system 1016. AI audio module 1074 may generate content 1076 that is displayed in emergency management applications 1024 (e.g., ECC emergency management application 1028, OC emergency management application 1030, FR emergency management application 1032). Content 1076 may include AI-generated summaries, incident characterization, keywords, telephone numbers, call-taker position ID, and/or transcripts of live call audio 1042. Content 1076 may also include one or more emergency response insights 1018, for example.

Algorithms 1075 may include decision trees, processes, methods, LLMs, and/or AI systems. Algorithms 1075 may be configured to cause the display one or more data cards having caller information. The caller information that is displayed may be automatically displayed for a particular phone number that a call-taker answers to respond to a 911 call. The caller information may include information such as location data 1046 that is representative of a location of a 911 call or a text to 911, which may be received from a third-party server 1006 (e.g., a telecommunications server), in accordance with aspects of the disclosure. The caller information may also include health information, name, weather information, caller history, first responder ETA, special standard operating procedures/instructions, or additional insights inferred from data sources 1004, for example. Upon receipt of additional data sources 1004 and/or user input 1077, algorithms 1075 may be configured to generate content 1076 (e.g., application calls 178, data cards, particular workflows, display of emergency response insights 1018, etc.) that may be transmitted to and/or displayed by ECC emergency management application 1028 and/or operations center emergency management application 1030, in accordance with various aspects of the disclosure. Various client-side components may be configured to interact with emergency management applications 1024 at the client using, for example, browser extensions, local applications, local LLMs, OS-based LLMs, and/or locally networked LLMs, according to embodiments.

Figure 11:
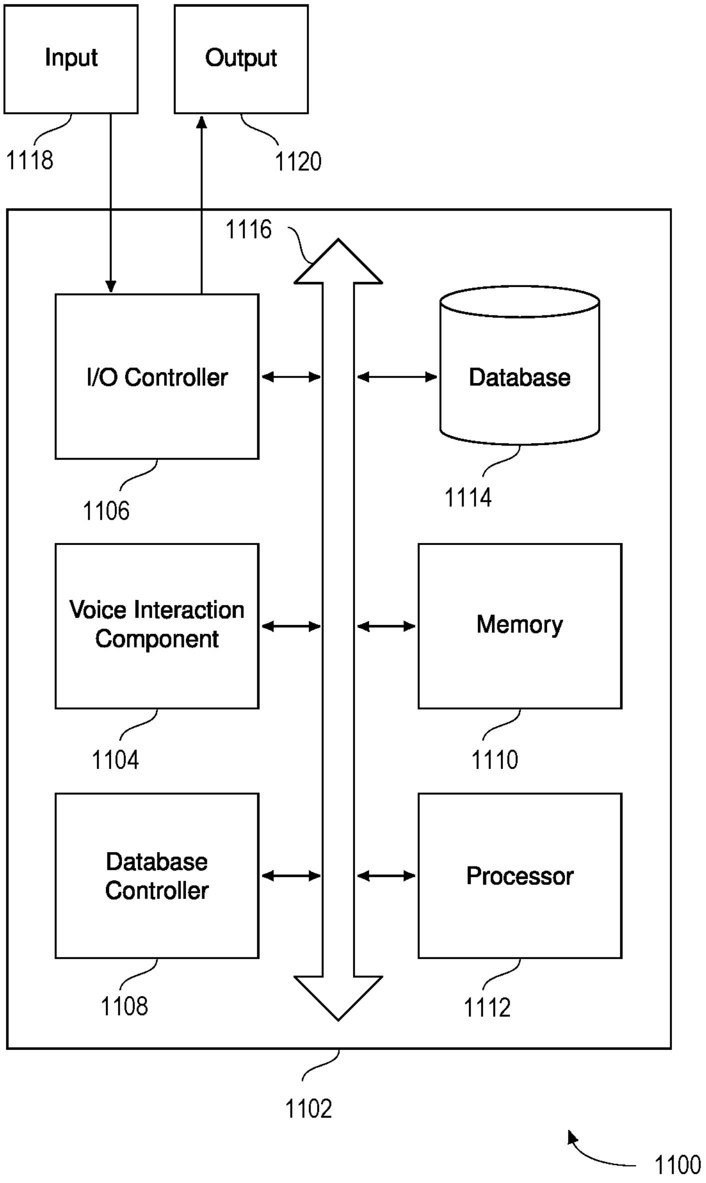
FIG. 11 shows a diagram of a system including a device that supports adapting AI voice interactions based on caller demographics and context in accordance with various aspects of the present disclosure.

FIG. 11 shows a diagram of a system 1100 including a device 1102 that supports adapting AI voice interactions based on caller demographics and context in accordance with aspects of the present disclosure. The device 1102 may be an example of or include the components of a database server or an apparatus 802 as described herein. The device 1102 may include components for bi-directional data communications including components for transmitting and receiving communications, including an AI voice interaction component 1104, an I/O controller 1106, a database controller 1108, memory 1110, a processor 1112, and a database 1114. These components may be in electronic communication via one or more buses (e.g., bus 1116).

The voice interaction component 1104 may be an example of an AI voice interaction component 806 or 902 as described herein. For example, the voice interaction component 1104 may perform any of the methods or processes described above with reference to FIGS. 8 and 9. In some cases, the voice interaction component 1104 may be implemented in hardware, software executed by a processor, firmware, or any combination thereof.

The I/O controller 1106 may manage input signals 1118 and output signals 1120 for the device 1102. The I/O controller 1106 may also manage peripherals not integrated into the device 1102. In some cases, the I/O controller 1106 may represent a physical connection or port to an external peripheral. In some cases, the I/O controller 1106 may utilize an operating system such as iOS®, ANDROID®, MS-DOS®, MS-WINDOWS®, OS/2®, UNIX®, LINUX®, or another known operating system. In other cases, the I/O controller 1106 may represent or interact with a modem, a keyboard, a mouse, a touchscreen, or a similar device. In some cases, the I/O controller 1106 may be implemented as part of a processor. In some cases, a user may interact with the device 1102 via the I/O controller 1106 or via hardware components controlled by the I/O controller 1106.

The database controller 1108 may manage data storage and processing in a database 1114. In some cases, a user may interact with the database controller 1108. In other cases, the database controller 1108 may operate automatically without user interaction. The database 1114 may be an example of a single database, a distributed database, multiple distributed databases, a data store, a data lake, or an emergency backup database.

Memory 1110 may include random-access memory (RAM) and read-only memory (ROM). The memory 1110 may store computer-readable, computer-executable software including instructions that, when executed, cause the processor to perform various functions described herein. In some cases, the memory 1110 may contain, among other things, a basic input/output system (BIOS) which may control basic hardware or software operation such as the interaction with peripheral components or devices.

The processor 1112 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1112 may be configured to operate a memory array using a memory controller. In other cases, a memory controller may be integrated into the processor 1112. The processor 1112 may be configured to execute computer-readable instructions stored in a memory 1110 to perform various functions (e.g., functions or tasks supporting adapting AI voice interactions based on caller demographics and context).

Figure 12:
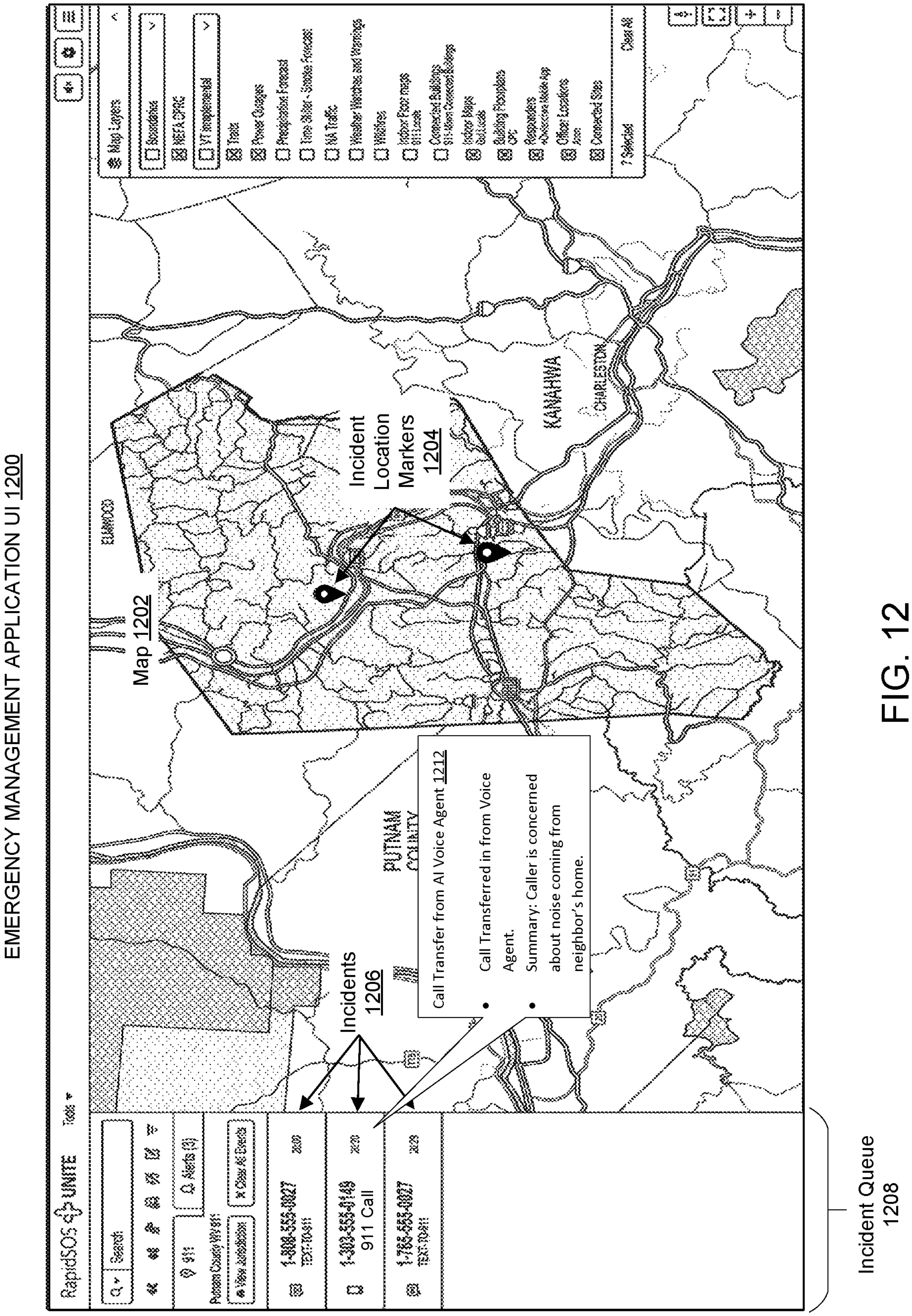
FIG. 12 show example diagrams of emergency management application user interfaces (UIs) in accordance with various aspects of the present disclosure

FIG. 12 illustrates emergency management application UI 1200, which is representative of emergency management applications and/or emergency management application UIs disclosed herein. Emergency management application UI 1200 includes a map 1202, incident location markers 1204, incidents 1206, and an incident queue 1208, according to an embodiment. The map 1202 is operable to display incident location markers 1204, according to an embodiment. The incident location markers 1204 correspond to incidents 1206 that may be organized into an incident queue 1208 for selection and navigation.

Emergency management application UI 1200 includes a notification 1212 that a call has been transferred from an AI voice agent, according to an embodiment. The notification 1212 is representative of a notification of a call being escalated to a human call-taker from an AI voice agent. The notification 1212 may be associated with a particular telephone number or incident in the emergency management application UI 1200 to indicate which call was previously handled by an AI agent. The notification 1212 may include a brief summary of the nature of the call or of information shared during the call to enable the call-taker to come up to speed efficiently. In one embodiment, the notification 1212 may include a transcript of the summary or may include one or more keywords that are relevant to the call.

Figure 13:
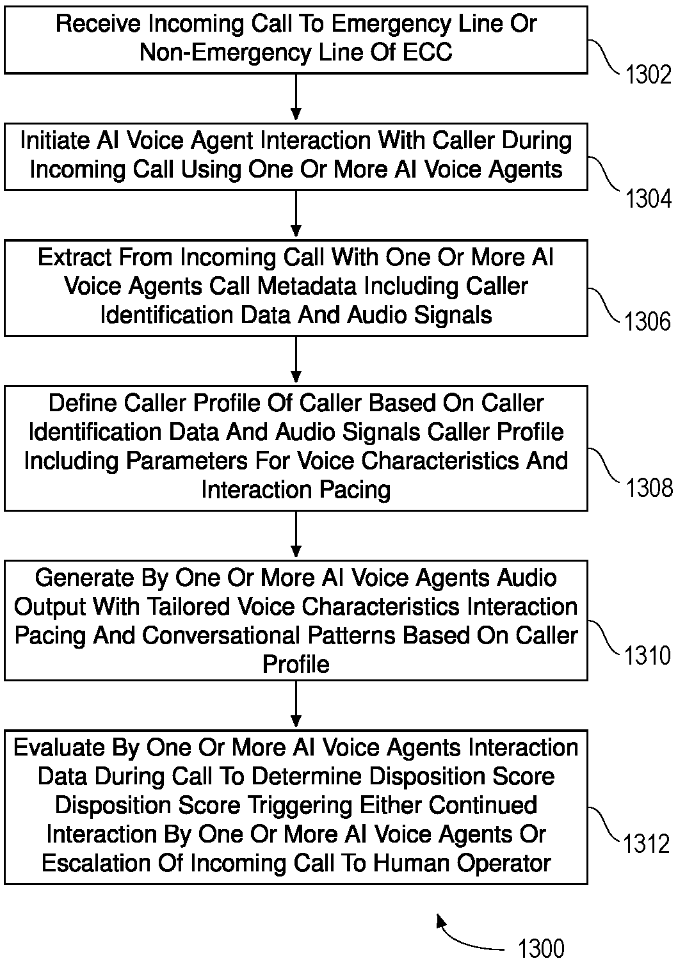
FIGS. 13 and 14 show flowcharts illustrating methods that support adapting AI voice interactions based on caller demographics and context in accordance with various aspects of the present disclosure.

FIG. 13 shows a flowchart illustrating a method 1300 that supports adapting AI voice interactions based on caller demographics and context in accordance with various aspects of the present disclosure. The operations of the method 1300 may be implemented by one or more components of a networked computing system as described herein. For example, the operations of the method 1300 may be performed by an AI voice interaction component as described with reference to FIGS. 8 and 9. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 1302, the method 1300 may include receiving, by a server, an incoming call to an emergency line or a non-emergency line of an ECC. The operations of 1302 may be performed in accordance with examples as disclosed herein. In some examples, aspects of the operations of 1302 may be performed by a call receiving component 904 as described with reference to FIG. 9.

At 1304, the method 1300 may include initiating AI voice agent interaction with a caller during the incoming call using one or more AI voice agents. The operations of 1304 may be performed in accordance with examples as disclosed herein. In some examples, aspects of the operations of 1304 may be performed by an AI interaction component 906 as described with reference to FIG. 9.

At 1306, the method 1300 may include extracting, from the incoming call with the one or more AI voice agents, call metadata including caller identification data and audio signals. The operations of 1306 may be performed in accordance with examples as disclosed herein. In some examples, aspects of the operations of 1306 may be performed by a metadata extraction component 908 as described with reference to FIG. 9.

At 1308, the method 1300 may include defining, by the server, a caller profile of the caller based on the caller identification data and the audio signals, the caller profile including parameters for voice characteristics and interaction pacing. The operations of 1308 may be performed in accordance with examples as disclosed herein. In some examples, aspects of the operations of 1308 may be performed by a profile defining component 910 as described with reference to FIG. 9.

At 1310, the method 1300 may include generating, by the one or more AI voice agents, audio output with tailored voice characteristics, interaction pacing, and conversational patterns based on the caller profile. The operations of 1310 may be performed in accordance with examples as disclosed herein. In some examples, aspects of the operations of 1310 may be performed by an audio output generation component 912 as described with reference to FIG. 9.

At 1312, the method 1300 may include evaluating, by the one or more AI voice agents, interaction data during the call to determine a disposition score, the disposition score triggering either continued interaction by the one or more AI voice agents or escalation of the incoming call to a human operator. The operations of 1312 may be performed in accordance with examples as disclosed herein. In some examples, aspects of the operations of 1312 may be performed by an interaction evaluation component 914 as described with reference to FIG. 9.

Figure 14:
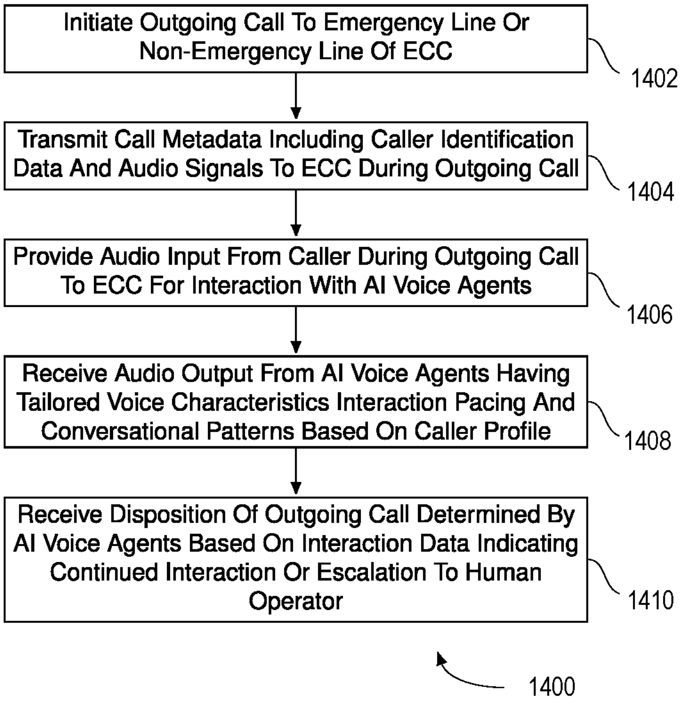

FIG. 14 shows a flowchart illustrating a method 1400 that supports adapting AI voice interactions based on caller demographics and context in accordance with various aspects of the present disclosure. The operations of the method 1400 may be implemented by one or more components of a networked computing system as described herein. For example, the operations of the method 1400 may be performed by an AI voice interaction component as described with reference to FIGS. 8, 9, and 11. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 1402, the method 1400 may include initiating, by a caller device, an outgoing call to an emergency line or a non-emergency line of an ECC. The operations of 1402 may be performed in accordance with examples as disclosed herein. In some examples, aspects of the operations of 1402 may be performed by a call receiving component 904 as described with reference to FIG. 9.

At 1404, the method 1400 may include transmitting, by the caller device, call metadata including caller identification data and audio signals to the ECC during the outgoing call. The operations of 1404 may be performed in accordance with examples as disclosed herein. In some examples, aspects of the operations of 1404 may be performed by a metadata extraction component 908 as described with reference to FIG. 9.

At 1406, the method 1400 may include providing, by the caller device, audio input from the caller during the outgoing call to the ECC for interaction with one or more AI voice agents. The operations of 1406 may be performed in accordance with examples as disclosed herein. In some examples, aspects of the operations of 1406 may be performed by an AI interaction component 906 as described with reference to FIG. 9.

At 1408, the method 1400 may include receiving, by the caller device, audio output from the one or more AI voice agents, the audio output having tailored voice characteristics, interaction pacing, and conversational patterns based on a caller profile defined by the ECC using the caller identification data and the audio signals. The operations of 1408 may be performed in accordance with examples as disclosed herein. In some examples, aspects of the operations of 1408 may be performed by an audio output generation component 912 as described with reference to FIG. 9.

At 1410, the method 1400 may include receiving, by the caller device, a disposition of the outgoing call, the disposition being determined by the one or more AI voice agents based on interaction data during the call, wherein the disposition indicates either continued interaction with the one or more AI voice agents or escalation of the outgoing call to a human operator. The operations of 1410 may be performed in accordance with examples as disclosed herein. In some examples, aspects of the operations of 1410 may be performed by a disposition scoring component 922 as described with reference to FIG. 9.

Figure 15:
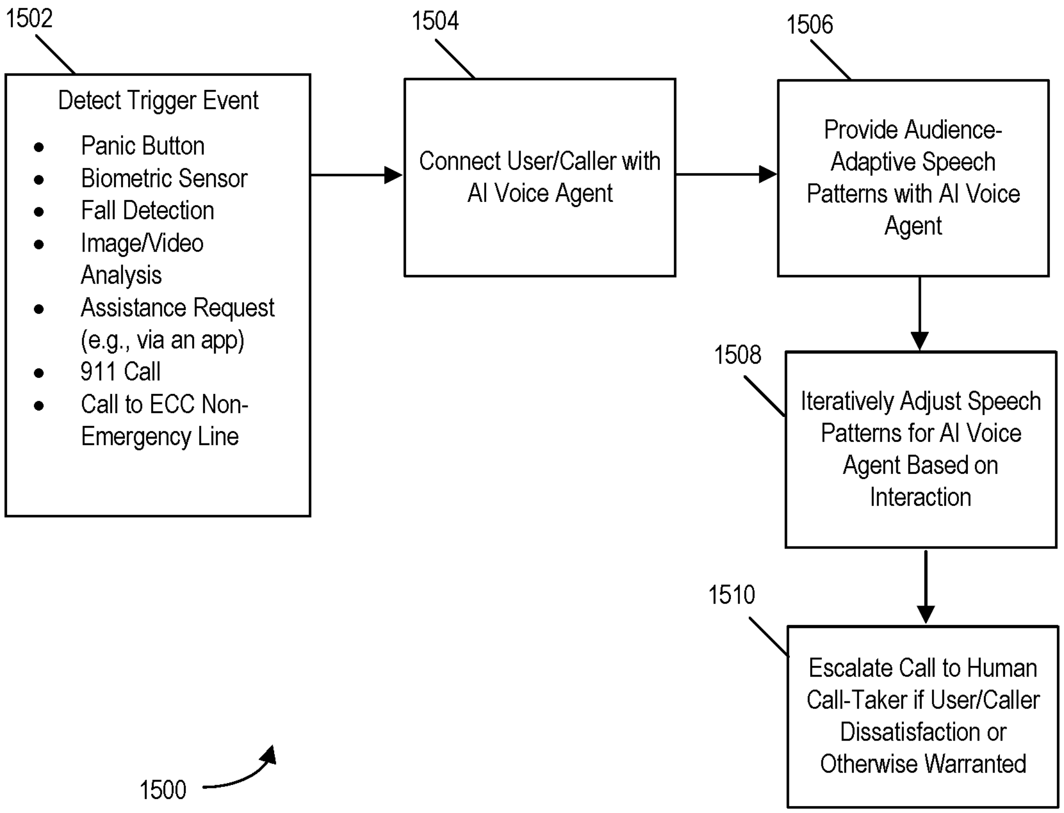
FIG. 15 shows a flow diagram of a process for providing audience-adaptive AI voice agent support for an emergency response system in accordance with various aspects of the present disclosure.

FIG. 15 shows a flow diagram of a process 1500 that supports audience-adaptive AI voice agent interactions with a user/caller in accordance with various aspects of the present disclosure. The operations of the process 1500 may be implemented by one or more components of a networked computing system as described herein. For example, the operations of the process 1500 may be performed by an AI voice interaction component as described with reference to FIGS. 8, 9, and 11. In some examples, one or more components of a networked computing system may execute a set of instructions to control the functional elements of the component(s) to perform the described functions. Additionally or alternatively, the one or more components of a networked computing system may perform aspects of the described functions using special-purpose hardware. One or more operations of process 1500 may be performed by an emergency response system and/or other aspects of the present disclosure.

At operation 1502, process 1500 includes detecting a trigger event, according to an embodiment. Trigger events may include but are not limited to a user activating a panic button, a biometric sensor detecting a health issue (e.g., a heart rate sensor detecting a slowing pulse), a fall detection (e.g., via a wearable sensor or room monitor), image/video analysis of a user in a room, assistance request (e.g., activated via an smartphone app), a 911 call to an ECC, a call to a non-emergency line for an ECC, for example. In some implementations, the system (e.g., emergency response system) may assign a priority level to each detected trigger event based on the nature and severity of the event, such that trigger events associated with life-threatening conditions (e.g., cardiac arrest indicators or fall detection with no subsequent movement) may be categorized at a higher priority than non-emergency assistance requests, according to an embodiment. When multiple trigger events are detected simultaneously or within a predefined time window from the same user or device, the system may aggregate the trigger events into a single consolidated event and may select the highest-priority trigger event to govern the urgency and routing of the AI voice agent interaction, according to an embodiment. The system may be configured to detect and process trigger events within a target latency threshold (e.g., less than two seconds from event occurrence to AI voice agent initiation) to support timely engagement with the user, according to an embodiment.

At operation 1504, process 1500 includes connecting a user/caller with an AI voice agent, according to an embodiment. Various technologies may be used to enable an AI voice agent to communicate with a user/caller. In one embodiment, a pool of telephone numbers and teleconference rooms are reserved for use by AI voice agents. If a trigger event does not include a telephone call, a first telephone number may be pulled from the pool and used to dial a number associated with the trigger event. The first telephone number may be connected to a teleconference room. A second telephone number may be used to connect an AI voice agent to the teleconference room. If the call is escalated to a human caller-taker, a third telephone number may be used to call the call-taker and connect the human call-taker to the teleconference room, for example. If the trigger event is a telephone call from a user/caller, the call may be routed to a teleconference room and a telephone number for the pool of telephone numbers may be used to connect the AI voice agent to the teleconference room to enable interaction between the user/caller and the AI voice agent. In some implementations, the system may be configured to establish the connection between the user/caller and the AI voice agent within a target latency threshold (e.g., less than three seconds from trigger event detection to active voice communication), and the system may monitor connection setup time to ensure compliance with the target latency threshold, according to an embodiment. If the primary connection method fails or exceeds the target latency threshold, the system may invoke a fallback mechanism, such as reattempting the connection using an alternative telephone number from the pool, routing through a secondary telephony provider, or establishing a WebRTC-based connection as an alternative to SIP trunking, according to an embodiment. The system may also perform audio quality monitoring during connection establishment by evaluating metrics such as signal-to-noise ratio, packet loss, and jitter to verify that the communication channel meets a minimum quality threshold before initiating the AI voice agent interaction, according to an embodiment.

At operation 1506, process 1500 includes providing audience-adaptive speech patterns with the AI voice agent, according to an embodiment. The audience-adaptive speech patterns may include adjustments to pitch, speech rate, pause duration, vocabulary complexity, and tone, such as lowering pitch to a warmer register and reducing speech rate for elderly callers or using simplified sentence structures and increased pause intervals for callers exhibiting signs of cognitive impairment, according to an embodiment. The AI voice agent may select initial speech pattern configurations based on the caller profile or demographic data determined during earlier operations of process 1500, such that the structured demographic profile object and any stored subscriber preferences may inform the selection of voice characteristics, conversational pacing, and vocabulary level prior to the first AI-generated utterance, according to an embodiment. In some implementations, the system may load preconfigured speech pattern templates from a configuration database, where each template corresponds to a demographic category or interaction scenario and includes a vector of parameter values for prosodic contours, phoneme duration, intonation patterns, and vocabulary complexity that may be applied to the voice synthesis pipeline, according to an embodiment.

At operation 1508, process 1500 includes iteratively adjusting speech patterns for AI voice agent based on the interaction with the user/caller, according to an embodiment. The adjustments may be triggered by detected interaction signals such as repeated clarification requests from the caller, extended silences exceeding a predefined duration threshold, low-confidence automatic speech recognition outputs, or acoustic distress markers including elevated pitch variance and irregular breathing patterns, according to an embodiment. In some implementations, the adjustments may be applied incrementally (e.g., reducing speech rate by a defined percentage per adjustment cycle rather than applying a large single change) to avoid disorienting the caller with abrupt shifts in voice characteristics or conversational pacing, according to an embodiment. The system may enforce upper and lower bounds on the cumulative magnitude of adjustments that may be applied during a single interaction, such that parameters including speech rate, pitch, and pause duration may not be adjusted beyond predefined minimum and maximum values, and if the bounds are reached without resolving detected communication difficulties, the system may escalate the call to a human operator, according to an embodiment.

At operation 1510, if the user/caller dissatisfaction is detected or if the nature of the call warrants expedition to a human call-taker, process 1500 includes escalating the call to a human call-taker, according to an embodiment. Indicators of dissatisfaction that may trigger escalation may include elevated pitch variance indicative of frustration or agitation, repeated use of frustration keywords (e.g., "help me," "I need a person," "this isn't working"), explicit requests for a human operator, or a disposition score exceeding a predefined escalation threshold, according to an embodiment. During escalation, the system may transfer contextual data to the human call-taker, including the caller profile, a summary of the interaction (e.g., topics discussed, caller responses, and detected difficulty signals), transcribed portions of the conversation, and any emergency keywords or acoustic distress markers identified during the call, according to an embodiment. In some implementations, the AI voice agent may remain connected to the call via a conference bridge during the handoff to assist the human call-taker with real-time transcription, suggested responses, or background data retrieval, or the AI voice agent may disconnect from the active audio channel after the human call-taker is connected while continuing to monitor the interaction for analytics purposes, according to an embodiment.

It should be noted that the methods described herein describe possible implementations, and that the operations and the steps may be rearranged or otherwise modified and that other implementations are possible. Furthermore, aspects from two or more of the methods may be combined.

Aspect 1: A method for adapting artificial intelligence (AI) voice interactions of a caller with an emergency communications center (ECC), comprising: receiving, by a server, an incoming call to an emergency line or a non-emergency line of an ECC; initiating AI voice agent interaction with a caller during the incoming call using one or more AI voice agents; extracting, from the incoming call with the one or more AI voice agents, call metadata including caller identification data and audio signals; defining, by the server, a caller profile of the caller based on the caller identification data and the audio signals, the caller profile including parameters for voice characteristics and interaction pacing; generating, by the one or more AI voice agents, audio output with tailored voice characteristics, interaction pacing, and conversational patterns based on the caller profile; and evaluating, by the one or more AI voice agents, interaction data during the call to determine a disposition score, the disposition score triggering either continued interaction by the one or more AI voice agents or escalation of the incoming call to a human operator.

Aspect 2: The method of aspect 1, further comprising analyzing the audio signals to extract acoustic features including fundamental frequency, speech rate, pause duration, and tremor characteristics, and classifying the caller into a demographic category based on a probabilistic model trained on these features.

Aspect 3: The method of any of aspects 1 through 2, further comprising retrieving a stored demographic profile associated with the caller identification data from a database and merging the retrieved demographic profile with the caller profile to refine the parameters for voice characteristics and interaction pacing.

Aspect 4: The method of any of aspects 1 through 3, further comprising dynamically adjusting the tailored voice characteristics, interaction pacing, and conversational patterns during the call in response to detecting difficulty signals including repeated clarification requests, extended silences, or low-confidence speech recognition outputs.

Aspect 5: The method of any of aspects 1 through 4, further comprising determining the disposition score by evaluating interaction data including transcribed caller speech for emergency keywords, acoustic distress signals, and metadata related to caller behavior during the interaction.

Aspect 6: The method of any of aspects 1 through 5, further comprising escalating the incoming call to a human operator by creating a conference bridge that connects the caller, the one or more AI voice agents, and the human operator, while transferring contextual data including the caller profile and interaction summary.

Aspect 7: The method of any of aspects 1 through 6, wherein the caller profile includes parameters for conversational patterns that are adjusted to include extended pauses and simplified vocabulary in response to detecting speech patterns indicative of cognitive impairment.

Aspect 8: The method of any of aspects 1 through 7, wherein the caller profile is refined by incorporating contextual signals from the originating device, including device type and associated user characteristics, to enhance demographic classification accuracy.

Aspect 9: The method of any of aspects 1 through 8, wherein the tailored voice characteristics include adjustments to prosodic contours and pitch variance to align with generational communication norms identified in the caller profile.

Aspect 10: The method of any of aspects 1 through 9, wherein the interaction pacing is dynamically modified during the call in response to detecting acoustic markers of emotional distress, including elevated pitch variance and irregular speech rhythm.

Aspect 11: The method of any of aspects 1 through 10, wherein the conversational patterns include increased confirmation loops and repetition of critical information in response to detecting low-confidence outputs from automatic speech recognition.

Aspect 12: The method of any of aspects 1 through 11, wherein the disposition score is further determined by analyzing metadata related to caller silence events and interaction duration to assess the likelihood of unresolved caller needs.

Aspect 13: A system for adapting artificial intelligence (AI) voice interactions of a caller with an emergency communications center (ECC), comprising a processor; memory coupled with the processor; and instructions stored in the memory and executable by the processor to cause the system to perform a method of any of aspects 1 through 12.

Aspect 14: A system for adapting artificial intelligence (AI) voice interactions of a caller with an emergency communications center (ECC), comprising at least one means for performing a method of any of aspects 1 through 12.

Aspect 15: A non-transitory computer-readable medium storing code for adapting artificial intelligence (AI) voice interactions of a caller with an emergency communications center (ECC), the code comprising instructions executable by a processor to perform a method of any of aspects 1 through 12.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for adapting artificial intelligence (AI) voice interactions of a caller with an emergency communications center (ECC), comprising:

receiving, by a server, an incoming call to an emergency line or a non-emergency line of an ECC;

initiating AI voice agent interaction with a caller during the incoming call using one or more AI voice agents;

extracting, from the incoming call, call metadata including caller identification data and audio signals;

defining, by the server, a caller profile of the caller based on the caller identification data and the audio signals, the caller profile including parameters for voice characteristics and interaction pacing;

generating, by one or more AI voice agents, audio output with tailored voice characteristics, interaction pacing, and conversational patterns based on the caller profile; and evaluating, by the one or more AI voice agents, interaction data during the call to determine a disposition score, the disposition score triggering either continued interaction by the one or more AI voice agents or escalation of the incoming call to a human operator.

2. The method of claim 1, further comprising analyzing the audio signals to extract acoustic features including fundamental frequency, speech rate, pause duration, and tremor characteristics, and classifying the caller into a demographic category based on a probabilistic model trained on these features.

3. The method of claim 1, further comprising retrieving a stored demographic profile associated with the caller identification data from a database and merging the demographic profile with the caller profile to refine the parameters for voice characteristics and interaction pacing.

4. The method of claim 1, further comprising dynamically adjusting the tailored voice characteristics, interaction pacing, and conversational patterns during the incoming call in response to detecting difficulty signals including repeated clarification requests, extended silences, or low-confidence speech recognition outputs.

5. The method of claim 1, further comprising determining the disposition score by evaluating interaction data including transcribed caller speech for emergency keywords, acoustic distress signals, and metadata related to caller behavior during the interaction.

6. The method of claim 1, further comprising escalating the incoming call to a human operator by creating a conference bridge that connects the caller, the one or more AI voice agents, and the human operator, while transferring contextual data including the caller profile and interaction summary.

7. The method of claim 1, wherein the caller profile includes parameters for conversational patterns that are adjusted to include extended pauses and simplified vocabulary in response to detecting speech patterns indicative of cognitive impairment.

8. The method of claim 1, wherein the caller profile is refined by incorporating contextual signals from an originating device associated with the incoming call, the contextual signals including device type and associated user characteristics, to enhance demographic classification accuracy.

9. The method of claim 1, wherein the tailored voice characteristics include adjustments to prosodic contours and pitch variance to align with generational communication norms identified in the caller profile.

10. The method of claim 1, wherein the interaction pacing is dynamically modified during the incoming call in response to detecting acoustic markers of emotional distress, including elevated pitch variance and irregular speech rhythm.

11. The method of claim 1, wherein the conversational patterns include increased confirmation loops and repetition of critical information in response to detecting low-confidence outputs from automatic speech recognition.

12. The method of claim 1, wherein the disposition score is further determined by analyzing metadata related to caller silence events and interaction duration to assess a likelihood of unresolved caller needs.

13. A system configured for adapting artificial intelligence (AI) voice interactions of a caller with an emergency communications center (ECC), comprising:

a processor;

memory coupled with the processor; and instructions stored in the memory and executable by the processor to cause the system to:

receive an incoming call to an emergency line or a non-emergency line of an ECC;

initiate AI voice agent interaction with a caller during the incoming call using one or more AI voice agents;

extract, from the incoming call with the one or more AI voice agents, call metadata including caller identification data and audio signals;

define a caller profile of the caller based on the caller identification data and the audio signals, the caller profile including parameters for voice characteristics and interaction pacing;

generate audio output with tailored voice characteristics, interaction pacing, and conversational patterns based on the caller profile; and evaluate interaction data during the call to determine a disposition score, the disposition score triggering either continued interaction by the one or more AI voice agents or escalation of the incoming call to a human operator.

14. The system of claim 13, wherein the instructions are further executable by the processor to cause the system to: analyze the audio signals to extract acoustic features including fundamental frequency, speech rate, pause duration, and tremor characteristics, and classify the caller into a demographic category based on a probabilistic model trained on these features.

15. The system of claim 13, wherein the instructions are further executable by the processor to cause the system to: retrieve a stored demographic profile associated with the caller identification data from a database and merge the demographic profile with the caller profile to refine parameters for voice characteristics and interaction pacing.

16. The system of claim 13, wherein the instructions are further executable by the processor to cause the system to: dynamically adjust the tailored voice characteristics, interaction pacing, and conversational patterns during the incoming call in response to detecting difficulty signals including repeated clarification requests, extended silences, or low-confidence speech recognition outputs.

17. The system of claim 13, wherein the instructions are further executable by the processor to cause the system to: determine the disposition score by evaluating interaction data including transcribed caller speech for emergency keywords, acoustic distress signals, and metadata related to caller behavior during the interaction.

18. The system of claim 13, wherein the instructions are further executable by the processor to cause the system to: escalate the incoming call to a human operator by creating a conference bridge that connects the caller, the one or more AI voice agents, and the human operator, while transferring contextual data including the caller profile and interaction summary.

19. The system of claim 13, wherein the caller profile includes parameters for conversational patterns that are adjusted to include extended pauses and simplified vocabulary in response to detecting speech patterns indicative of cognitive impairment, and wherein the caller profile is further refined by incorporating contextual signals from an originating device associated with the incoming call, the contextual signals including device type and associated user characteristics, to enhance demographic classification accuracy.

20. A non-transitory computer-readable medium storing code for adapting artificial intelligence (AI) voice interactions of a caller with an emergency communications center (ECC), the code comprising instructions executable by a processor to:

receive an incoming call to an emergency line or a non-emergency line of an ECC;

initiate AI voice agent interaction with a caller during the incoming call using one or more AI voice agents;

extract, from the incoming call with the one or more AI voice agents, call metadata including caller identification data and audio signals;

define a caller profile of the caller based on the caller identification data and the audio signals, the caller profile including parameters for voice characteristics and interaction pacing;

generate audio output with tailored voice characteristics, interaction pacing, and conversational patterns based on the caller profile; and evaluate interaction data during the call to determine a disposition score, the disposition score triggering either continued interaction by the one or more AI voice agents or escalation of the incoming call to a human operator.

* * * * *